US009584683B2

(12) United States Patent
Numao et al.

(10) Patent No.: US 9,584,683 B2
(45) Date of Patent: Feb. 28, 2017

(54) IMAGE FORMING APPARATUS WITH ROTATIONAL CUTTER AND CUT FORMING APPARATUS

(71) Applicant: FUJI XEROX CO., LTD., Tokyo (JP)

(72) Inventors: Kazunori Numao, Ebina (JP); Shigeyoshi Kuroyanagi, Yokohama (JP); Jisun Choi, Yokohama (JP); Yasuhiro Kusumoto, Yokohama (JP); Masayoshi Nakao, Ebina (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/813,994

(22) Filed: Jul. 30, 2015

(65) Prior Publication Data

US 2016/0286064 A1 Sep. 29, 2016

(30) Foreign Application Priority Data

Mar. 27, 2015 (JP) ................. 2015-067708

(51) Int. Cl.
| | |
|---|---|
| *B65C 9/18* | (2006.01) |
| *H04N 1/00* | (2006.01) |
| *G06K 15/02* | (2006.01) |
| *G06K 15/16* | (2006.01) |
| *G06K 15/00* | (2006.01) |

(52) U.S. Cl.
CPC ....... *H04N 1/00679* (2013.01); *G06K 15/022* (2013.01); *G06K 15/16* (2013.01); *G06K 15/4025* (2013.01); *H04N 1/00639* (2013.01); *H04N 1/00649* (2013.01); *H04N 2201/0094* (2013.01)

(58) Field of Classification Search
None
See application file for complete search history.

(56) References Cited

U.S. PATENT DOCUMENTS 4,347,525 A * 8/1982 Moore .................. G06K 1/121
101/227
5,540,148 A * 7/1996 Oumiya .................. B41F 13/12
101/212

(Continued)

FOREIGN PATENT DOCUMENTS

| JP | 08-002787 A | 1/1996 |
|---|---|---|
| JP | 2003-279312 A | 10/2003 |
| JP | 2014-191707 A | 10/2014 |

*Primary Examiner* — Paul F Payer
(74) *Attorney, Agent, or Firm* — Sughrue Mion, PLLC

(57) ABSTRACT

An image forming apparatus includes a transport unit that transports a continuous medium; an image forming unit that forms an image on a surface of the medium; a pasting unit that pastes a protection member to the surface of the medium on which the image has been formed; an inspection unit disposed downstream of the image forming unit in a direction in which the medium is transported, the inspection unit inspecting whether the image is defective; a cutting unit disposed downstream of the inspection unit in the direction, the cutting unit being capable of performing an operation of forming a cut in the protection member and the medium so as to surround the image; and a controller that controls the cutting unit so that the cutting unit does not perform the operation of forming a cut in the protection member and the medium if the image is defective.

8 Claims, 12 Drawing Sheets

(56) References Cited

U.S. PATENT DOCUMENTS

| | | | |
|---|---|---|---|
| 7,031,026 B2* | 4/2006 | Prakash | H04N 1/00002 |
| | | | 358/1.9 |
| 9,248,671 B2* | 2/2016 | Nagahara | B31D 1/021 |
| 2014/0285853 A1* | 9/2014 | Hiramatsu | G06K 15/1872 |
| | | | 358/3.24 |
| 2014/0292841 A1 | 10/2014 | Nagahara | |

* cited by examiner

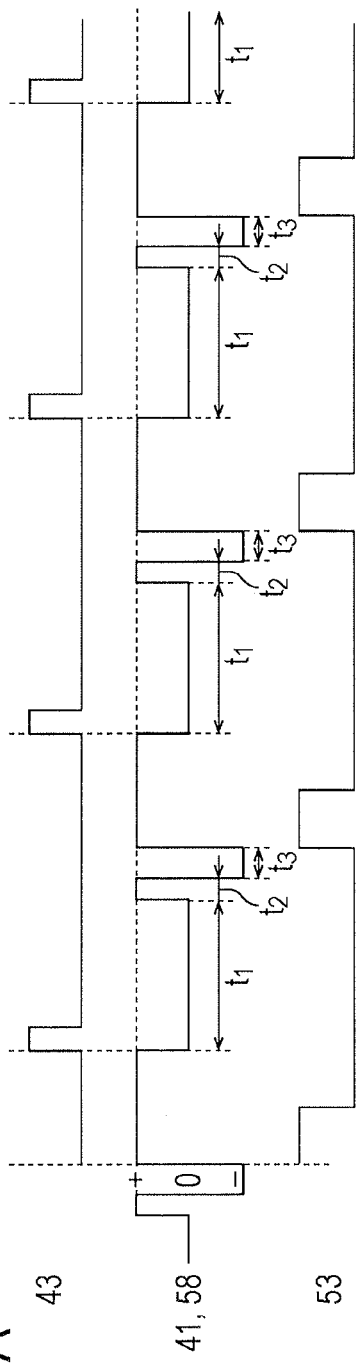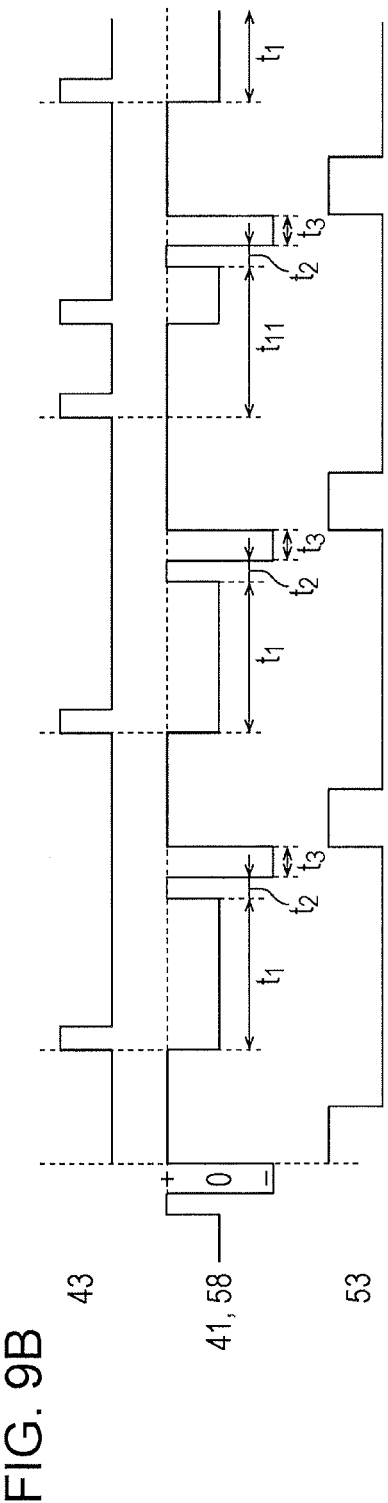

IMAGE FORMING APPARATUS WITH ROTATIONAL CUTTER AND CUT FORMING APPARATUS

CROSS-REFERENCE TO RELATED APPLICATIONS

This application is based on and claims priority under 35 USC 119 from Japanese Patent Application No. 2015-067708 filed Mar. 27, 2015.

BACKGROUND

Technical Field

The present invention relates to an image forming apparatus and a cut forming apparatus.

SUMMARY

According to an aspect of the invention, an image forming apparatus includes a transport unit that transports a continuous medium; an image forming unit that forms an image on a surface of the medium; a pasting unit that pastes a protection member to the surface of the medium on which the image has been formed; an inspection unit disposed downstream of the image forming unit in a direction in which the medium is transported, the inspection unit inspecting whether the formed image is defective; a cutting unit disposed downstream of the inspection unit in the direction in which the medium is transported, the cutting unit being capable of performing an operation of forming a cut in the protection member and the medium so as to surround the formed image; and a controller that controls the cutting unit so that the cutting unit does not perform the operation of forming a cut in the protection member and the medium if the image is defective.

BRIEF DESCRIPTION OF THE DRAWINGS

Exemplary embodiments of the present invention will be described in detail based on the following figures, wherein:

FIGS. 9A and 9B illustrate control of a transport unit according to the first exemplary embodiment, representing timing charts of driving the transport unit, FIG. 9A illustrating an example of a clipping set timing, and FIG. 9B illustrating an example of a forward rotation restart set timing;

DETAILED DESCRIPTION

Hereinafter, specific examples of exemplary embodiments of the invention (hereinafter, referred to as "exemplary embodiments") will be described with reference to the drawings. The present invention is not limited to the exemplary embodiments described below.

To facilitate understanding the following description, the directions in the figures are defined as follows: the front-back direction is the X-axis direction, the left-right direction is the Y-axis direction, and the vertical direction is the Z-axis direction. The directions indicated by arrows X, −X, Y, −Y, Z, and −Z are respectively called forward, backward, rightward, leftward, upward, and downward; or the front side, the back side, the right side, the left side, the upper side, and the lower side.

In each of the figures, "O" with "•" in it represents an arrow extending from the back side toward the front side of the plane of the figure, "O" with "x" in it represents an arrow extending from the front side toward the back side of the plane of the figure.

In the following descriptions using the figures, members that are not necessary for understanding the descriptions are omitted.

First Embodiment

Figure 1:
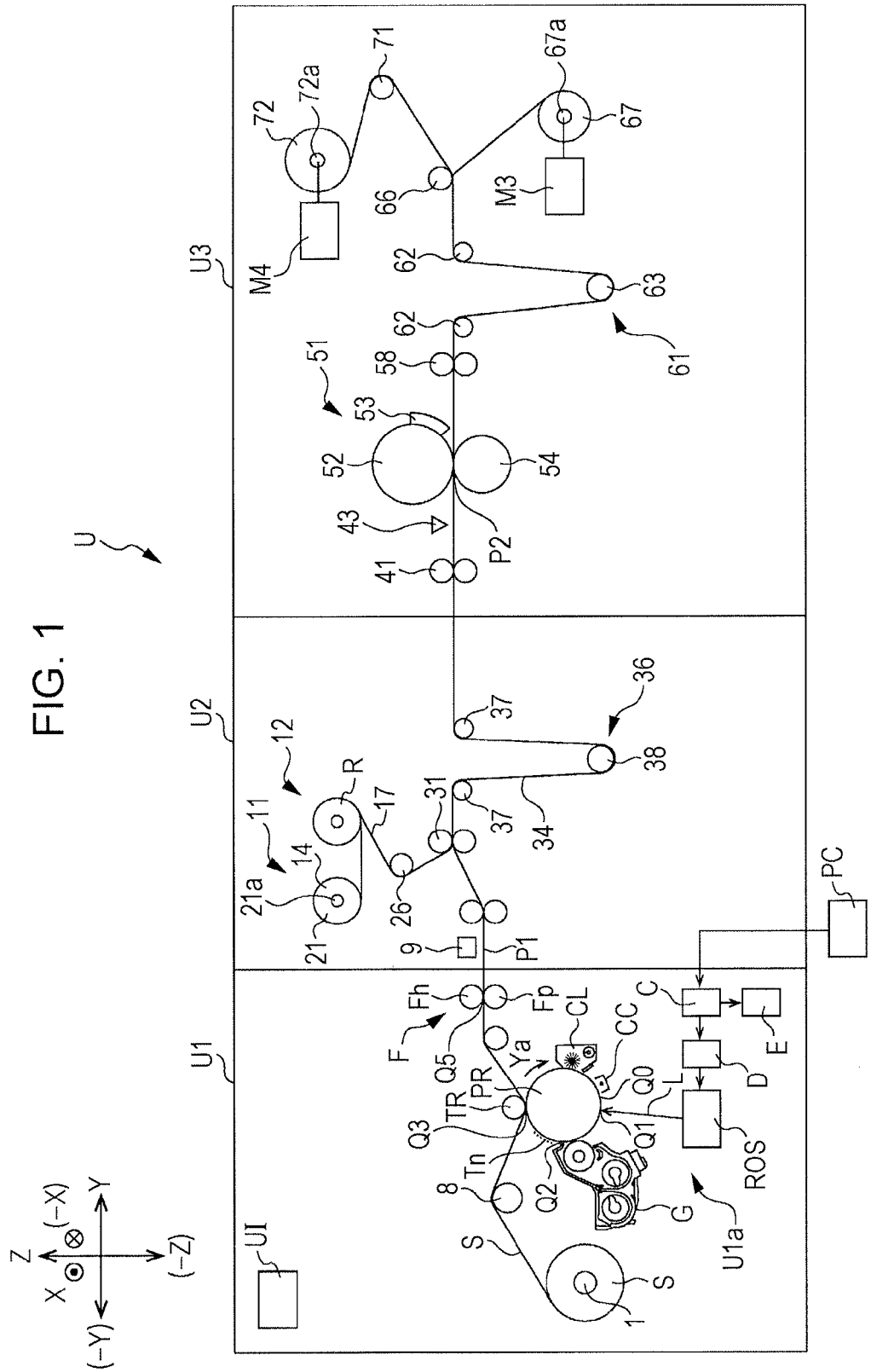
FIG. 1 illustrates the entirety of an image forming apparatus according to a first exemplary embodiment.

FIG. 1 illustrates the entirety of an image forming apparatus according to a first exemplary embodiment.

Referring to FIG. 1, an image forming apparatus U according to the first exemplary embodiment of the present invention includes a printer unit U1, which is an example of an image forming unit. An operation unit UI, which is an example of an input unit, is supported in an upper left portion of the printer unit U1. It is possible for a user to operate the image forming apparatus U by performing input to the operation unit UI.

A personal computer PC, which is an example of an image information transmission unit, is electrically connected to the printer unit U1. It is possible to input image information transmitted from the personal computer PC to the controller C of the printer unit U1.

The controller C converts image information input from the personal computer PC into image information for forming a latent image. In the first exemplary embodiment, the controller C converts input image information into image information for forming an image using only black (K), which is so-called monochrome image information. The controller C outputs the converted image information to a writing circuit D at a predetermined timing. The writing circuit D is electrically connected to an exposure device ROS, which is an example of a latent image forming device. In the first exemplary embodiment, the exposure device ROS is capable of emitting a laser beam L, which is an example of a writing beam, in accordance with a signal input from the writing circuit D.

A photoconductor drum PR, which is an example of an image carrier, is disposed above the exposure device ROS. The photoconductor drum PR rotates in the direction of arrow Ya. A corotron CC, which is an example of a charger, is disposed so as to face the photoconductor drum PR in a charging region Q0. A charging voltage is applied to the corotron CC from a power circuit E. The power circuit E is controlled by the controller C. The controller C also performs various control operations by sending signals to and receiving signals from the writing circuit D. A writing region Q1 is set downstream of the charging region Q0 with respect to the direction in which the photoconductor drum PR rotates.

The exposure device ROS irradiates a surface of the photoconductor drum PR in the writing region Q1 with the laser beam L. A developing region Q2 is set downstream of the writing region Q1 with respect to the direction in which the photoconductor drum PR rotates. A developing device G is disposed so as to face a surface of the photoconductor drum PR in the developing region Q2. A transfer region Q3 is set downstream of the developing region Q2 with respect to the direction in which the photoconductor drum PR rotates. A photoconductor cleaner CL, which is an example of a cleaner of an image carrier, is disposed downstream of the transfer region Q3 so as to face the photoconductor drum PR.

Figure 2A:
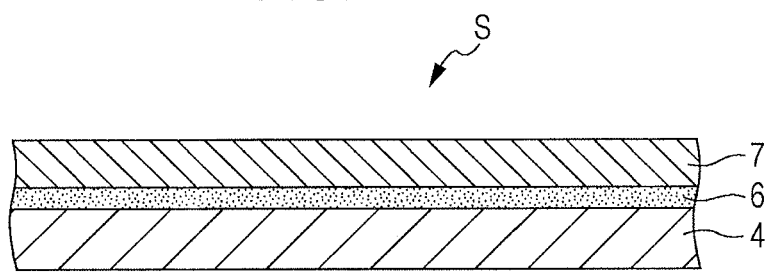
FIG. 2A illustrates a medium according to the first exemplary embodiment.
Figure 2B:
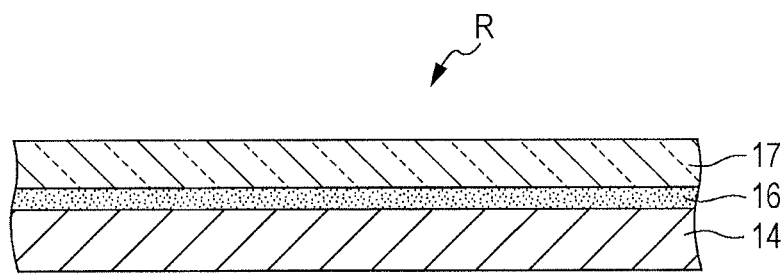
FIG. 2B illustrates a second medium according to the first exemplary embodiment.

FIG. 2A illustrates a medium according to the first exemplary embodiment, and FIG. 2B illustrates a second medium according to the first exemplary embodiment.

A first supply roller 1, which is an example of a medium supply unit, is disposed in a lower left portion of the printer unit U1. The first supply roller 1 according to the first exemplary embodiment is rotatable. A strip-shaped continuous sheet S, which is an example of a medium, is wound around and supported by the first supply roller 1. Referring to FIG. 2A, the continuous sheet S according to the first exemplary embodiment includes a release sheet 4, which is an example of a backing sheet. The release sheet 4 according to the first exemplary embodiment has a continuous strip-like shape. A label sheet 7, which is an example of a front sheet, is affixed to a surface of the release sheet 4 by using an adhesive 6, which is an example of an adhesive layer. The label sheet 7 according to the first exemplary embodiment has a continuous strip-like shape, which corresponds to the shape of the release sheet 4.

A guide roller 8, which is an example of a contact member, is disposed on the right side of the first supply roller 1. A photoconductor drum PR is disposed on the right side of the guide roller 8. A transfer roller TR, which is an example of a transfer member, is disposed above the photoconductor drum PR. In the first exemplary embodiment, the transfer roller TR is disposed so that the continuous sheet S is nipped between the transfer roller TR and the photoconductor drum PR in the transfer region Q3. A transfer voltage is applied to the transfer roller TR from the power circuit E. In the first exemplary embodiment, the photoconductor drum PR, the corotron CC, the exposure device ROS, the developing device G, the transfer roller TR, and the photoconductor cleaner CL constitute a visible image forming device U1a. A fixing unit F is disposed downstream of the transfer region Q3 with respect to the direction in which the continuous sheet is transported. The fixing unit F includes a heating roller Fh, which is an example of a fixing member for heating, and a pressing roller Fp, which is an example of a fixing member for pressing. A fixing region Q5 is a region in which the heating roller Fh and the pressing roller Fp are in contact.

Description of Function of Printer Unit

In the printer unit U1 according to the first exemplary embodiment, which has the structure described above, when image information is input from the personal computer PC to the printer unit U1, the controller C converts the image information into image information for forming a latent image. The converted image information is output to the writing circuit D. In the writing circuit D, the exposure device ROS is controlled to emit the laser beam L in accordance with the input image information. The photoconductor drum PR is rotated when an image forming operation is started.

A charging voltage is applied to the corotron CC from the power circuit E. Accordingly, the surface of the photoconductor drum PR is charged by the corotron CC. The laser beam L emitted from the exposure device ROS forms an electrostatic latent image on the surface of the charged photoconductor drum PR in the writing region Q1.

In the developing region Q2, the developing device G develops the electrostatic latent image on the photoconductor drum PR into a toner image Tn, which is an example of a visible image and an example of an image. A transfer voltage, which has a polarity opposite to that of the charge of the toner, is applied to the transfer roller TR from the power circuit E. Accordingly, in the transfer region Q3, the transfer roller TR transfers the toner image Tn on the photoconductor drum PR to the label sheet 7 of the continuous sheet S.

Substances remaining on or adhering to the photoconductor drum PR after transfer is cleaned by the photoconductor cleaner CL. The cleaned surface of the photoconductor drum PR is charged again by the corotron CC. The continuous sheet S, to which the toner image Tn has been transferred in the transfer region Q3, is transported to the fixing region Q5, and the toner image Tn is heated and fixed to the continuous sheet S passing through the fixing region Q5.

Description of Pasting Device

Referring to FIG. 1, a pasting device U2, which is an example of a pasting unit, is disposed on the right side of the printer unit U1. A reading position P1 is set at a left end portion of the pasting device U2 according to the first exemplary embodiment. A line camera 9, which is an example of an inspection unit and an example of an image reading member, is disposed at the reading position P1.

A second medium supply device 11 is disposed in an upper left portion of the pasting device U2 according to the first exemplary embodiment. The second medium supply device 11 includes a second supply roller 12, which is an example of a medium supply unit. The second supply roller 12 is rotatable. A strip-shaped second continuous sheet R, which is an example of a second medium, is wound around and supported by the second supply roller 12.

Referring to FIG. 2B, the second continuous sheet R according to the first exemplary embodiment includes a second release sheet 14. The second release sheet 14 according to the first exemplary embodiment has a continuous strip-like shape. A protection film 17, which is an example of a protection member and an example of a second front sheet, is affixed to a surface of the second release sheet 14 using an adhesive 16. The protection film 17 according to the first exemplary embodiment has a continuous strip-like shape, which corresponds to the shape of the second release sheet 14. The protection film 17 according to the first exemplary embodiment is made of a thin-film-shaped resin material. With the structure of the first exemplary embodiment, for example, a thin light-transmitting film made of polyethylene terephthalate (PET) may be used as the protection film 17.

A winding roller 21, which is an example of a winding member, is disposed on the left side of the second supply roller 12. A driving force is transmitted from a winding motor (not shown), which is an example of a driving system, to a rotary shaft 21a of the winding roller 21 according to the first exemplary embodiment. In the first exemplary embodiment, the winding roller 21 is rotatable by being driven by the winding motor. One end of the second release sheet 14 is supported by the winding roller 21. Thus, when the winding roller 21 rotates, the second release sheet 14 is wound around the winding roller 21, and the second release sheet 14 is peeled off the protection film 17. A guide roller 26, which is an example of a guide member, is disposed below the second medium supply device 11.

A pair of pasting rollers 31, which are an example of a pasting unit, is disposed below the guide roller 26. A driving force is transmitted from a driving motor (not shown), which is an example of a driving system, to the pasting rollers 31. Thus, the pasting rollers 31 rotate in a state in which the continuous sheet S and the protection film 17 are nipped between the pasting rollers 31. At this time, the continuous sheet S and the protection film 17, which are nipped between the pasting rollers 31, are pasted to each other using the adhesive 16. Thus, the pasting rollers 31 according to the first exemplary embodiment form a pasted body 34, in which the protection film 17 and the continuous sheet S are pasted to each other.

A first buffer device 36, which is an example of a warp-amount adjusting device, is disposed on the right side of the pasting rollers 31. The first buffer device 36 includes plural first support rollers 37, which are an example of a support member. The first support rollers 37 according to the first exemplary embodiment are arranged in a direction in which the medium is transported. In the first exemplary embodiment, the pasted body 34 is supported by the first support rollers 37. The first buffer device 36 includes a first tension roller 38, which is an example of a first tension member, at a position between the first support rollers 37 with respect to the direction in which the medium is transported.

The first tension roller 38 according to the first exemplary embodiment has a roller-like shape extending in the front-back direction. Front and back ends of the first tension roller 38 are supported by a frame (not shown) so that the first tension roller 38 is movable in the up-down direction and rotatable. In the first exemplary embodiment, the first tension roller 38 is in contact with the upper surface of the pasted body 34, and a tension generated by the weight of the first tension roller 38 is applied to the pasted body 34.

Description of Postprocessing Unit

A label forming device U3, which is an example of a postprocessing unit, is disposed on the right side of the pasting device U2. A pair of first transport rollers 41, which are an example of a transport unit, are disposed on the right side of the label forming device U3 according to the first exemplary embodiment. The first transport rollers 41 according to the first exemplary embodiment are disposed downstream of the first buffer device 36 with respect to the direction in which the medium is transported. A forward rotational driving force or a backward rotational driving force is transmitted from a first transport motor (not shown), which is an example of a driving system, to the first transport rollers 41 according to the first exemplary embodiment. In the first exemplary embodiment, as the first transport motor is driven, the first transport rollers 41 rotate and transport the pasted body 34 downstream or upstream in the direction in which the medium is transported in a state in which the first transport rollers 41 nip the pasted body 34.

Figure 3:
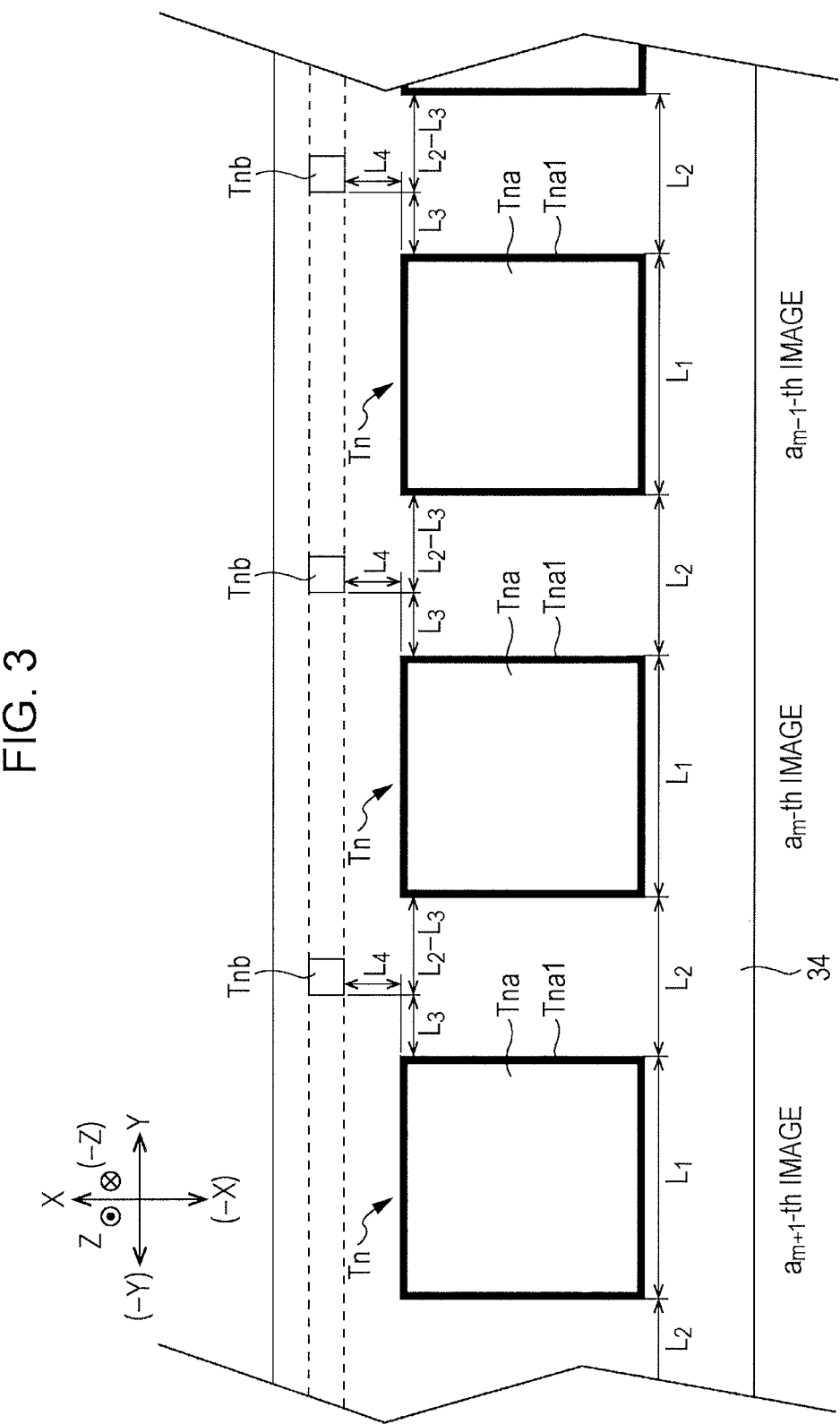
FIG. 3 illustrates images recorded on the medium according to the first exemplary embodiment.

FIG. 3 illustrates images recorded on the medium according to the first exemplary embodiment.

As illustrated in FIG. 3, plural toner images Tn are fixed to the pasted body 34 according to the first exemplary embodiment. Each toner image Tn includes a label image Tna, which is an example of an image body. The label image Tna according to the first exemplary embodiment has a length $L_1$ in the direction in which the medium is transported. With the structure of the first exemplary embodiment, adjacent label images Tna are formed so as to be separated from each other by a distance $L_2$ in the direction in which the medium is transported.

Each toner image Tn includes a mark image Tnb, which is an example of an image for adjustment, at a position on the right front side of the label image Tna with respect to the direction in which the medium is transported. The mark image Tnb according to the first exemplary embodiment is disposed so as to be separated from a front end of a corresponding one of the label images Tna by a distance $L_3$ with respect to the direction in which the medium is transported. The position of the mark image Tnb according to the first exemplary embodiment is separated from a side end of the label image Tna by a distance $L_4$ outward in the width direction of the medium.

A mark sensor 43, which is an example of a detection member, is disposed on the right side of the transport roller 41. With respect to the width direction of the medium, the mark sensor 43 according to the first exemplary embodiment is disposed at a position corresponding to the position of the mark image Tnb on the pasted body 34.

Figure 4:
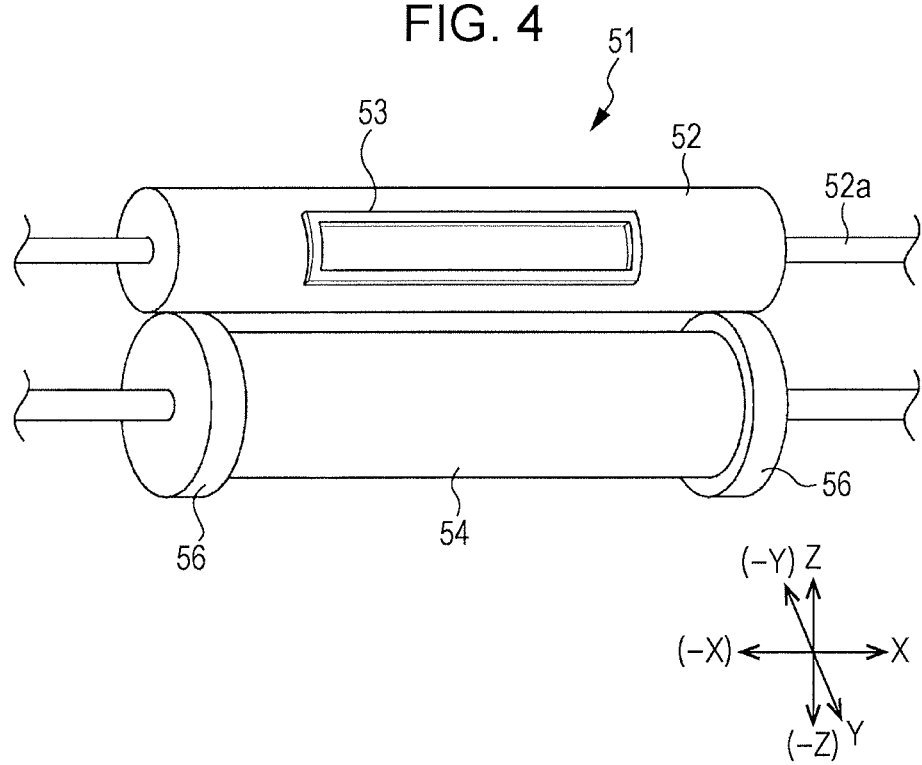
FIG. 4 illustrates a part of a cutting unit according to the first exemplary embodiment.

FIG. 4 illustrates a part of a cutting unit according to the first exemplary embodiment.

A rotary die-cutter 51, which is an example of a cutting unit, is disposed at a cutting position P2 on the right side of the mark sensor 43.

Referring to FIG. 4, the rotary die-cutter 51 includes a die-cut roller 52, which is an example of a rotational body. The die-cut roller 52 according to the first exemplary embodiment has a roller-like shape extending in the front-back direction. With the structure of the first exemplary embodiment, the circumference of the die-cut roller 52 is larger than the distance $L_2$ between adjacent label images Tna. A driving force is transmitted from a driving motor (not shown), which is an example of a driving system, to a rotary shaft 52a of the die-cut roller 52. In the first exemplary embodiment, the die-cut roller 52 is rotatable by being driven by the driving motor.

A blade 53, which is an example of a cutting member, is supported on a part of the outer peripheral surface of the die-cut roller 52. The blade 53 according to the first exemplary embodiment has a frame-like shape corresponding to an inner edge Tna1 of the label image Tna on the pasted body 34 and protrudes outward the radial direction from the peripheral surface of the die-cut roller 52.

The rotary die-cutter 51 further includes an anvil roller 54, which is an example of a facing member, at a position below the die-cut roller 52. The anvil roller 54 according to the first exemplary embodiment has a roller-like shape extending in the front-back direction. A pair of front and back contact portions 56 are supported at end portions of the anvil roller 54 in the front-back direction.

Figure 5:
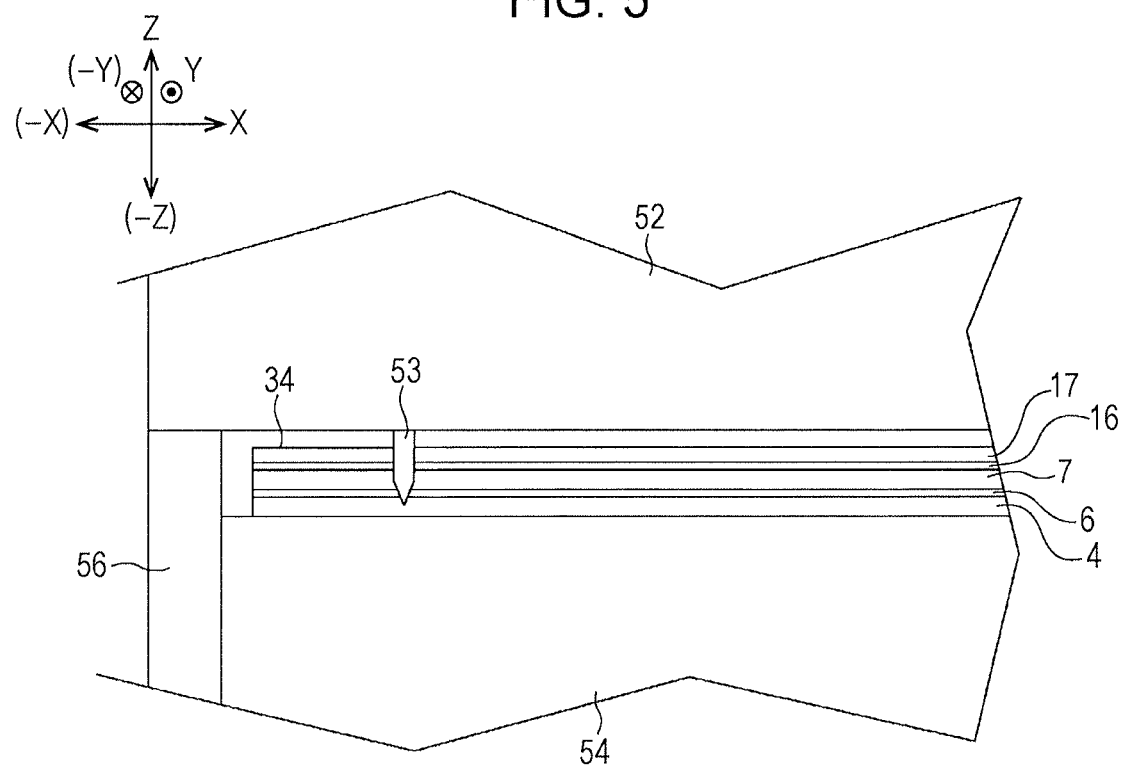
FIG. 5 illustrates a state in which a cutting member according to the first exemplary embodiment has moved to a cutting position.

FIG. 5 illustrates a state in which the cutting member according to the first exemplary embodiment has moved to a cutting position.

The diameter of each of the contact portions 56 according to the first exemplary embodiment is larger than the diameter of the anvil roller 54, and the difference between the diameter of the contact portions 56 and the diameter of the anvil roller 54 is larger than or equal to the thickness of the pasted body 34. Thus, it is possible for the contact portions 56 to be in contact with the die-cut roller 52 in a state in which the pasted body 34 is supported on the peripheral surface of the anvil roller 54. As illustrated in FIG. 5, in the structure of the first exemplary embodiment, the diameter of each of the contact portions 56 is determined beforehand so that, when the blade 53 moves to the cutting position P2 as the die-cut roller 52 rotates, the blade 53 penetrates through the protection film 17, the adhesive 16, the label sheet 7, and the adhesive 6, but does not penetrate through the release sheet 4 from the upper surface of the pasted body 34.

Referring to FIG. 1, a pair of second transport rollers 58, which are an example of a transport unit, is disposed on the right side of the rotary die-cutter 51. A forward rotational driving force or a backward rotational driving force is transmitted to the second transport rollers 58 according to the first exemplary embodiment from a second transport motor (not shown), which is an example of a driving system. With the structure of the first exemplary embodiment, the first transport motor and the second transport motor are driven in synchronism with each other. Thus, as the second transport motor is driven, the second transport rollers 58 rotate and transport the pasted body 34 downstream or upstream in the direction in which the medium is transported in a state in which the second transport rollers 58 nip the pasted body 34.

A second buffer device 61, which is an example of a warp-amount adjusting device, is disposed on the right side of the second transport rollers 58. The second buffer device 61 includes plural rollers 62 and a roller 63, which respectively correspond to the plural rollers 37 and the roller 38, and has a structure similar to that of the first buffer device 36.

Figure 6:
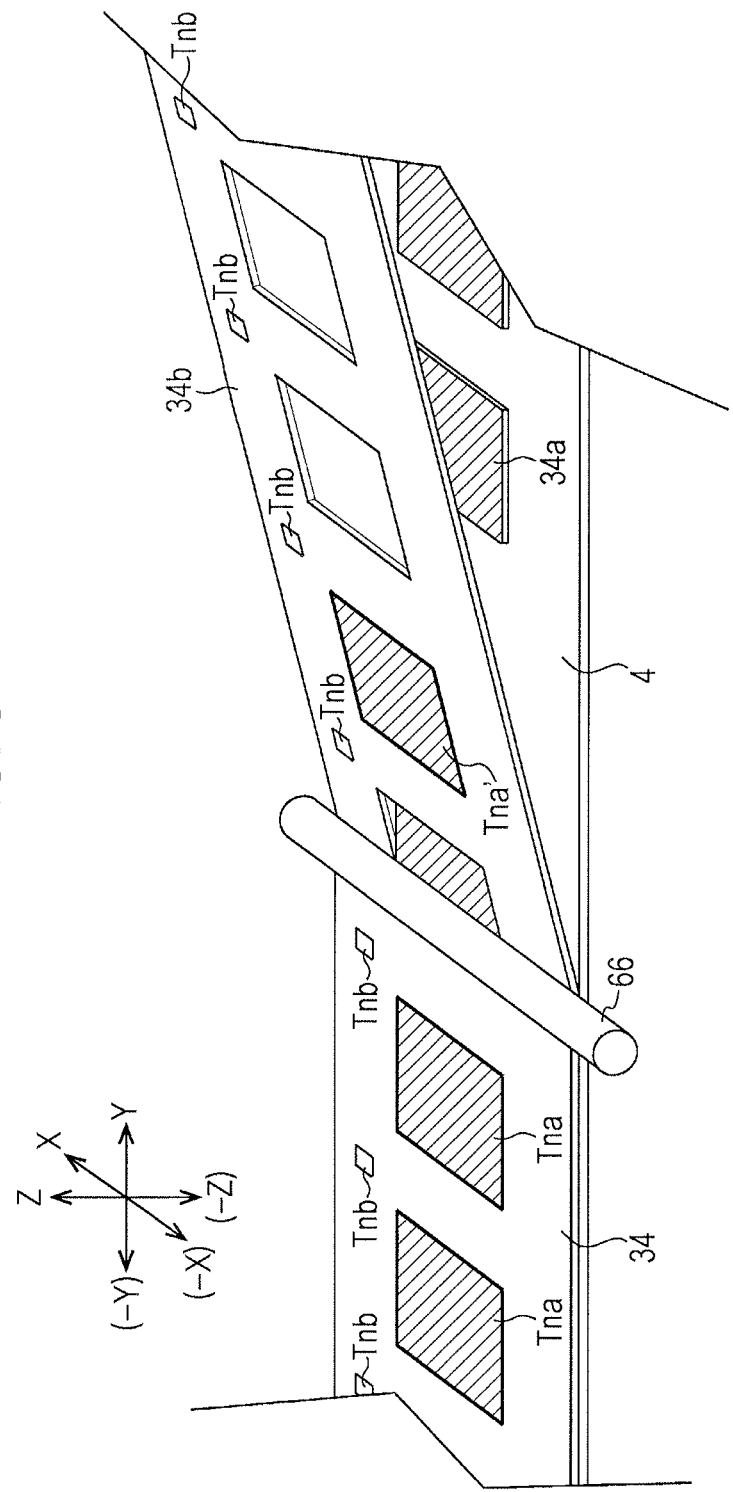
FIG. 6 is a partial enlarged view of a split member according to the first exemplary embodiment.

FIG. 6 is a partial enlarged view of a split member according to the first exemplary embodiment.

A split roller 66, which is an example of a split member, is disposed on the right side of the second buffer device 61. Referring to FIG. 6, the split roller 66 according to the first exemplary embodiment is rotatable and is in contact with the upper surface of the pasted body 34.

A second winding roller 67, which is an example of a second winding member, is disposed on the lower right side of the split roller 66. A driving force is transmitted from a second winding motor M3, which is an example of a driving system, to a rotary shaft 67a of the second winding roller 67. In the first exemplary embodiment, the second winding roller 67 is rotatable by being driven by the second winding motor M3. A label member 34a, which is an example of an image forming medium and an example of a label, is supported on a surface of the release sheet 4; and one end of the release sheet 4 is supported by the second winding roller 67.

A guide roller 71, which is an example of a guide member, is disposed on the upper right side of the split roller 66. A first winding roller 72, which is an example of a first winding member, is disposed on the upper left side of the guide roller 71. A driving force is transmitted from a first winding motor M4, which is an example of a driving system, to a rotary shaft 72a of the first winding roller 72. In the first exemplary embodiment, the first winding roller 72 is rotatable by being driven by the first winding motor M4. One end of a scrap member 34b, which is an example of a scrap and which is formed by removing the label member 34a from the pasted body 34, is supported by the first winding roller 72.

Description of Controller According to First Exemplary Embodiment

Figure 7:
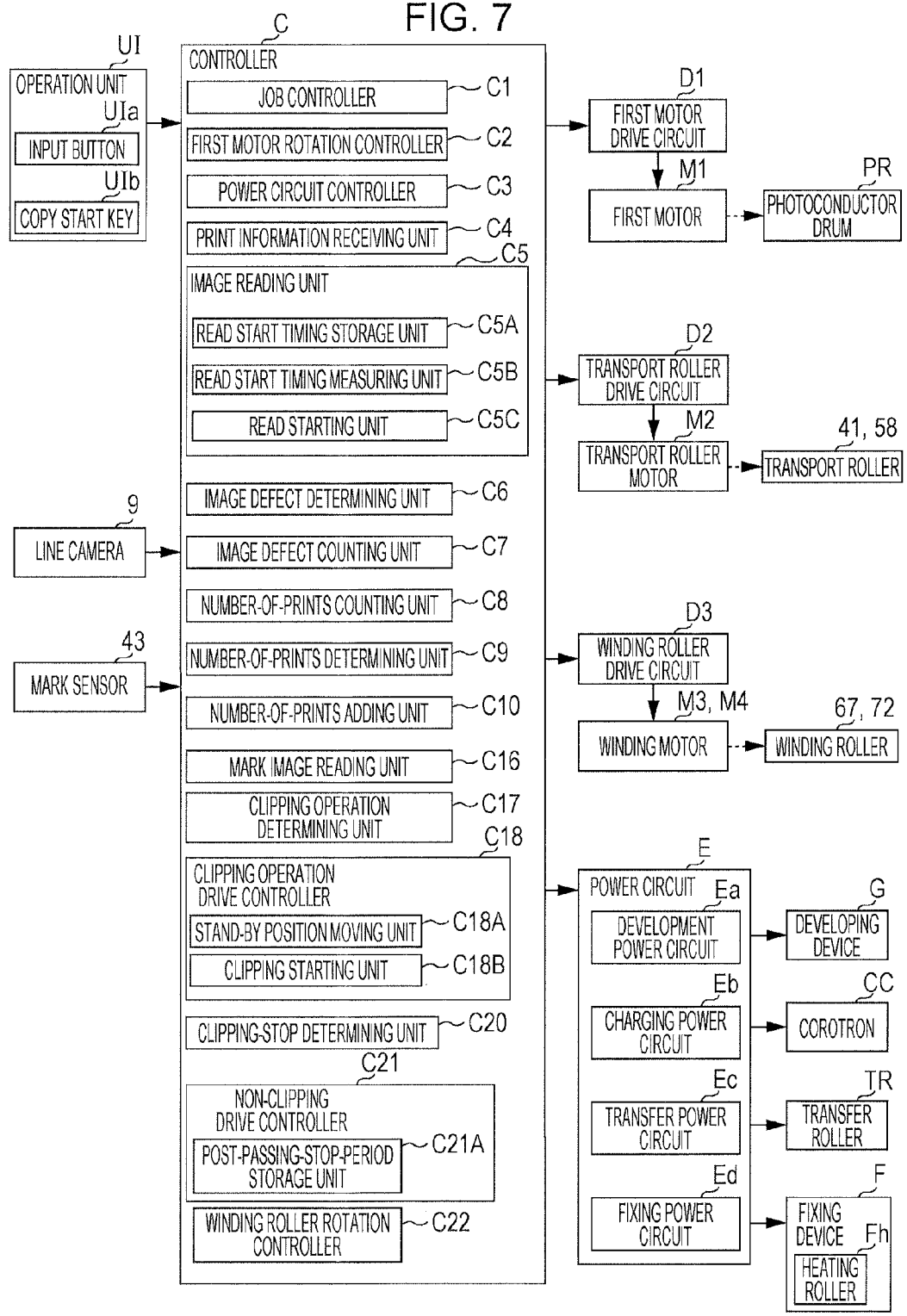
FIG. 7 is a block diagram showing the functions of a controller of the image forming apparatus according to the first exemplary embodiment.

FIG. 7 is a block diagram showing the functions of a controller of the image forming apparatus according to the first exemplary embodiment.

Referring to FIG. 7, the controller C of the image forming apparatus U includes an input-output interface I/O, through which a signal is input from and output to an external device. The controller C includes a read only memory (ROM), in which a program, information, and the like for performing necessary processing are stored. The controller C includes a random access memory (RAM) for temporarily storing necessary data. The controller C includes a central processing unit (CPU), which performs processing in accordance with a program stored in the ROM or the like. Accordingly, the controller C according to the first exemplary embodiment is a small information processing device, which is a so-called microcomputer. Thus, the controller C is capable of performing various functions by executing the program stored in the ROM or the like.

Signal Output Elements Connected to Controller C

Signals that are output from the signal output elements, such as the personal computer PC, the operation unit UI, the line camera 9, and the mark sensor 43, are input to the controller C of the printer unit U1.

The operation unit UI includes an input button UIa, which is used to input the number of prints, arrows, and the like; and a copy start key UIb, which is an example of an input member for inputting instruction for starting a job.

The line camera 9 reads a toner image Tn recorded on the continuous sheet S.

The mark sensor 43 reads the mark image Tnb recorded on the continuous sheet S.

Controlled Elements Connected to Controller C

The controller C is connected to controlled elements, such as a first motor drive circuit D1, a transport roller drive circuit D2, a winding motor drive circuit D3, a power circuit E, and the like (not shown). The controller C outputs control signals to the circuits D1, D2, D3, E, and the like.

D1: First Motor Drive Circuit

The first motor drive circuit D1, which is an example of a first driving source drive circuit, rotates the photoconductor drum PR and the like via a first motor M1, which is an example of a first driving source.

D2: Transport Roller Drive Circuit

The transport roller drive circuit D2, which is an example of a transport unit drive circuit, rotates the transport rollers 41 and 58 by driving a transport roller motor M2, which is an example of a driving source for transporting.

D3: Winding Motor Drive Circuit

The winding motor drive circuit D3, which is an example of a winding member drive circuit, rotates the winding rollers 67 and 72 by driving the winding motors M3 and M4.

E: Power Circuit

The power circuit E includes a development power circuit Ea, a charging power circuit Eb, a transfer power circuit Ec, a fixing power circuit Ed, and the like.

Ea: Development Power Circuit

The development power circuit Ea applies a development voltage to a developing roller of the developing device G.

Eb: Charging Power Circuit

The charging power circuit Eb applies a charging voltage, for charging the surface of a photoconductor drum PR, to the corotron CC.

Ec: Transfer Power Circuit

The transfer power circuit Ec applies a transfer voltage to the transfer roller TR.

Ed: Fixing Power Circuit

The fixing power circuit Ed supplies electric power for heating a heater to a heating roller Fh of the fixing unit F.

Functions of Controller C

The controller C includes the following functional units, which are implemented in programs for controlling the operations of the controlled elements in accordance with the output signals output from the signal output elements.

C1: Job Controller

A job controller C1, which is an example of an image forming operation controller, executes a job, which is an example of an image forming operation, by controlling the corotron CC, the transfer roller TR, the fixing unit F, and the like in accordance with image information transmitted from the personal computer PC or the like.

C2: First Motor Rotation Controller

A first motor rotation controller C2, which is an example of a first driving source rotation controller, controls the rotation of the first motor M1 via the first motor drive circuit D1, and thereby controls driving of the photoconductor drum PR, the developing device G, the heating roller Fh of the fixing unit F, and the like.

C3: Power Circuit Controller

A power circuit controller C3 controls the operation of the power circuit E, and thereby controls supply of electric voltages and currents to the developing device G, the corotron CC, the transfer roller TR, the heater of the heating roller Fh of the fixing unit F, and the like.

C4: Print Information Receiving Unit

A print information receiving unit C4 receives and stores print information. The print information receiving unit C4 according to the first exemplary embodiment receives and stores print information, which has been input by a user beforehand, through the personal computer PC. Print information according to the first exemplary embodiment includes image information of the label image Tna to be printed on the continuous sheet S and print number information, which is an example of number-of-prints information. The number-of-prints information is about the total print number Na, which represents the number of times images are to be printed on the continuous sheet S.

C5: Image Reading Unit

An image reading unit C5, which reads the toner image Tn recorded on the continuous sheet S, includes a read start timing storage unit C5A, a read start timing measuring unit C5B, and a read starting unit C5C. With the image reading unit C5 according to the first exemplary embodiment, when a toner image Tn is transported to the reading position P1 and if the line camera 9 reads the mark image Tnb, the line camera 9 reads the label image Tna corresponding to the mark image Tnb.

C5A: Read Start Timing Storage Unit

The read start timing storage unit C5A stores a start timing at which the line camera 9 starts reading the toner image Tn recorded on the continuous sheet S. The read start timing storage unit C5A according to the first exemplary embodiment stores the distance $L_3$ between a mark image Tnb and a corresponding label image Tna, which is an example of a timing at which reading of a label image Tna recorded on the continuous sheet S is started.

C5B: Read Start Timing Measuring Unit

A reading start timing measuring unit C5B measures a transport distance of the continuous sheet S. The reading start timing measuring unit C5B according to the first exemplary embodiment measures the transport distance of the continuous sheet S on the basis of the amount of rotation of the pasting rollers 31. The reading start timing measuring unit C5B according to the first exemplary embodiment starts the measurement every time the line camera 9 reads the mark image Tnb recorded on the continuous sheet S at the reading position P1.

C5C: Read Starting Unit

The read starting unit C5C starts reading an image recorded on the continuous sheet S. The read starting unit C5C according to the first exemplary embodiment starts reading the label image Tna recorded on the continuous sheet S by using the line camera 9 if the transport distance of the continuous sheet S becomes $L_3$.

C6: Image Defect Determining Unit

An image defect determining unit C6 determines whether or not an image recorded on the continuous sheet S has a defect. The image defect determining unit C6 according to the first exemplary embodiment determines whether or not the label image Tna recorded on the continuous sheet S has a defect, which is an example of an image defect, on the basis of the image information received by the print information receiving unit C4 and each label image Tna read by the image reading unit C5. Such an image defect may be generated due to contact while the images are being transported, transfer failure, or the like.

C7: Image Defect Counting Unit

The image defect counting unit C7 obtains a cumulative image defect number M, which is the total number of label images Tna' determined to have image defects, on the basis of determination as to whether or not the label image has an image defect. The image defect counting unit C7 according to the first exemplary embodiment obtains the cumulative defect number M, which is the total number of label images Tna' determined to have image defects, on the basis of the results of determination made by the image defect determining unit C6.

C8: Number-of-Prints Counting Unit

A number-of-prints counting unit C8, which is an example of a counting unit and an example of a print number counting unit, counts the number of times the toner images Tn are printed on the continuous sheet S, which is an example of the number of prints. The number-of-prints counting unit C8 according to the first exemplary embodiment calculates the remaining print number N, which is an example of the remaining number of prints, by subtracting 1 from the total print number Na every time an image is printed.

C9: Number-of-Prints Determining Unit

A number-of-prints determining unit C9, which is an example of a print number determining unit, determines whether or not the print number N obtained by the number-of-prints counting unit C8 has reached the total print number Na received from the print information receiving unit C4. The print number determining unit C9 according to the first exemplary embodiment determines that the remaining print number N has reached the total print number Na if the remaining print number N calculated by the number-of-prints counting unit C8 becomes 0.

C10: Number-of-Prints Adding Unit

A number-of-prints adding unit C10, which is an example of an adding unit and an example of a print number adding unit, adds the number of the toner images Tn to be printed on the continuous sheet S. The number-of-prints adding unit C10 according to the first exemplary embodiment adds the cumulative image defect number M, which is obtained by the image defect counting unit C7, to the remaining print number N, which is calculated by the number-of-prints counting unit C8, if the print number determining unit C9 determines that the remaining print number N has reached the total print number Na.

C16: Mark Image Reading Unit

A mark image reading unit C16, which is an example of an adjustment image reading unit, reads the toner image Tn recorded on the transported continuous sheet S. With the mark image reading unit C16 according to the first exemplary embodiment, the mark sensor 43 reads the mark image Tnb recorded on the continuous sheet S.

C17: Clipping Operation Determining Unit

A clipping operation determining unit C17, which is an example of a cutting operation determining unit, determines whether or not to perform a clipping operation, which is an operation of clipping the toner image Tn by forming a cut in the toner image Tn recorded on the continuous sheet S by using the rotary die-cutter 51. On the basis of the result of determination by the image defect determining unit C6, the clipping operation determining unit C17 according to first exemplary embodiment determines that the clipping operation is to be performed if the label image Tna corresponding to the mark image Tnb read by the mark image reading unit C16 does not have an image defect, and determines that the clipping operation is not to be performed if the label image Tna has an image defect.

C18: Clipping Operation Drive Controller

A clipping operation drive controller C18, which is an example of a controller and an example of a transport unit drive controller, includes a stand-by position moving unit C18A and a clipping starting unit C18B. If the transported label image Tna does not have an image defect, the clipping operation drive controller C18 controls driving of the transport rollers 41 and 58 by controlling driving of the transport roller motor M2 via the transport roller drive circuit D2.

If the clipping operation determining unit C17 determines that the clipping operation is to be performed, the clipping operation drive controller C18 according to the first exemplary embodiment controls driving of the transport rollers 41 and 58 so that the following operations are performed: as the die-cut roller 52 rotates, the front end of the label image Tna is transported to the stand-by position P3 in accordance with the timing at which the front end of the blade 53 moves to the stand-by position P3; the pasted body 34 is transported in synchronism with the rotation of the die-cut roller 52; and the blade 53 forms a cut in the inner edge Tna1 of the label image Tna on the pasted body 34.

Figure 8:
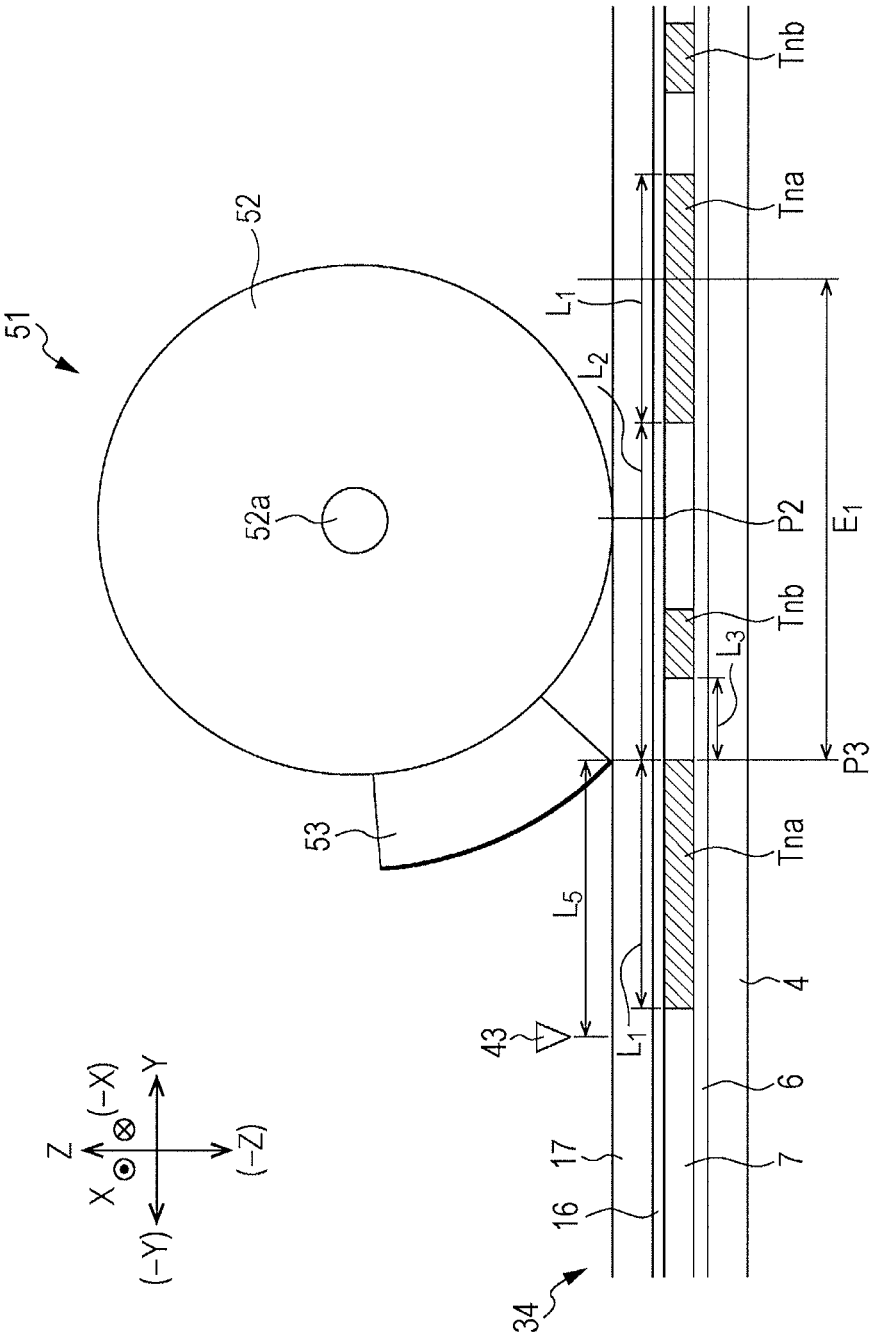
FIG. 8 illustrates a state in which a front end of the cutting member according to the first exemplary embodiment has come into contact with a medium.

FIG. 8 illustrates a state in which a front end of the cutting member according to the first exemplary embodiment has come into contact with a medium.

C18A: Stand-by Position Moving Unit

If the clipping operation determining unit C17 determines that a clipping operation is to be performed, the stand-by position moving unit C18A rotates the transport rollers 41 and 58 to move the label image Tna recorded on the continuous sheet S to a predetermined stand-by position P3. In the first exemplary embodiment, as illustrated in FIG. 8, the stand-by position P3 is a position at which the front end of the blade 53 comes into contact with the pasted body 34 as the die-cut roller 52 rotates.

FIGS. 9A and 9B illustrate control of a transport unit according to the first exemplary embodiment, representing timing charts of driving the transport unit, FIG. 9A illustrating an example of a clipping set timing, and FIG. 9B illustrating an example of a forward rotation restart set timing.

The stand-by position moving unit C18A according to the first exemplary embodiment transports the pasted body 34 to move the front end of the label image Tna to the stand-by position P3 so that the front end of the blade 53 comes into contact with the front end of the label image Tna recorded on the continuous sheet S as the die-cut roller 52 rotates. To be specific, as illustrated in FIG. 9A, in the stand-by position moving unit C18A according to the first exemplary embodiment, a first stop period $t_1$, a forward rotation period $t_2$, and a backward rotation period $t_3$ are set in accordance with the rotation of the die-cut roller 52, the distance $L_3$ between the mark image Tnb and the front end of the label image Tna, and the distance $L_5$ between the mark sensor 43 and the stand-by position P3. The stand-by position moving unit C18A according to the first exemplary embodiment stops the forward rotation of each of the transport rollers 41 and 58 from the time at which the mark image Tnb is read by the mark image reading unit C16 to the time at which a first stop period $t_1$ elapses. After the first stop period $t_1$ has elapsed and before the forward rotation period $t_2$ elapses, the transport rollers 41 and 58 are rotated forward, and after the forward rotation period $t_2$ has elapsed and before the backward rotation period $t_3$ elapses, the transport rollers 41 and 58 are rotated backward, so that the front end of the label image Tna is aligned with the stand-by position P3.

C18B: Clipping Starting Unit

When performing a clipping operation, the clipping starting unit C18B starts forming a cut in the toner image Tn by rotating the transport rollers 41 and 58 forward in synchronism with the rotation of the die-cut roller 52. The clipping starting unit C18B according to the first exemplary embodiment rotates the transport rollers 41 and 58 forward after the stand-by position moving unit C18A has moved the label image Tna to the stand-by position P3 in synchronism with the rotation of the die-cut roller 52. Thus, the pasted body 34 is transported in a state in which the movement speed of the blade 53 is adjusted with the transport speed of the pasted body 34.

C20: Clipping-Stop Determining Unit

A clipping-stop determining unit C20, which is an example of a cutting stop determining unit, determines whether or not to stop the clipping operation of the rotary die-cutter 51. If two defective label images Tna' are successively arranged in the direction in which the medium is transported, the clipping-stop determining unit C20 according to the first exemplary embodiment outputs a signal so as stop the rotary die-cutter 51. With the structure of the first exemplary embodiment, if two defective label images Tna' are successively arranged, driving of the first motor M1, the transport motor M2, and the like are stopped, and jobs, such as an image forming operation, a transport operation, and the like are stopped.

C21: Non-Clipping Drive Controller

A non-clipping drive controller C21, which is an example of a controller and an example of a transport unit drive controller, includes a post-passing-stop-period storage unit C21A. If a defective label image Tna' is transported, the non-clipping drive controller C21 controls driving of the transport rollers 41 and 58 by controlling driving of the transport roller motor M2 via the transport roller drive circuit D2.

With the non-clipping drive controller C21 according to the first exemplary embodiment, if the clipping operation determining unit C17 determines that the label image Tna has a defect and the clipping-stop determining unit C20 determines that the defective label images Tna' are not successively arranged, in a separation period from the time at which the back end of the blade 53 separates from the continuous sheet S to the time at which the front end of the blade 53 comes into contact with the continuous sheet S again, the label image Tna' passes through a clipping region E1, which is a region in which the blade 53 is in contact with the continuous sheet S, as the die-cut roller 52 rotates. The non-clipping drive controller C21 according to the first exemplary embodiment continues to rotate the transport rollers 41 and 58 forward even when the previous label image Tna has been clipped, so that the defective label image Tna' passes through the clipping region E1. When the next mark image Tnb is read, the transport rollers 41 and 58 are stopped. Accordingly, driving of the transport rollers 41 and 58 are controlled so that the blade 53 may not form a cut in the defective label image Tna'.

C21A: Post-Passing-Stop-Period Storage Unit

If the defective label image Tna' is not clipped, as illustrated in FIG. 9B, the post-passing-stop-period storage unit C21A stores a second stop period $t_{11}$, which is an example of a period from the time at which the next mark image Tnb is read to the time at which the next label image Tna is started to be moved to the stand-by position P3. The second stop period $t_{11}$ according to the first exemplary embodiment is set shorter than the first stop period $t_1$, as the defective label image Tna' is passed.

C22: Winding Roller Rotation Controller

A winding roller rotation controller C22, which is an example of a winding member rotation controller, controls the rotation of the winding rollers 67 and 72 by driving the winding motors M3 and M4 via the winding motor drive circuit D3. If warp of the pasted body 34, which is a so-called buffer, becomes larger in each of the buffer devices 36 and 61 as the pasted body 34 is transported, the winding roller rotation controller C22 according to the first exemplary embodiment winds the scrap member 34b and the release sheet 4 by rotating each of the winding rollers 67 and 72. If the buffer becomes smaller, the winding roller rotation controller C22 stops winding the scrap member 34b and the release sheet 4 by stopping the rotation of each of the winding rollers 67 and 72.

Description of Flowchart of First Exemplary Embodiment

Next, the process of controlling the image forming apparatus U according to a first exemplary embodiment will be described with reference to a flowchart.

Description of Process of Inspecting Read Image

Figure 10:
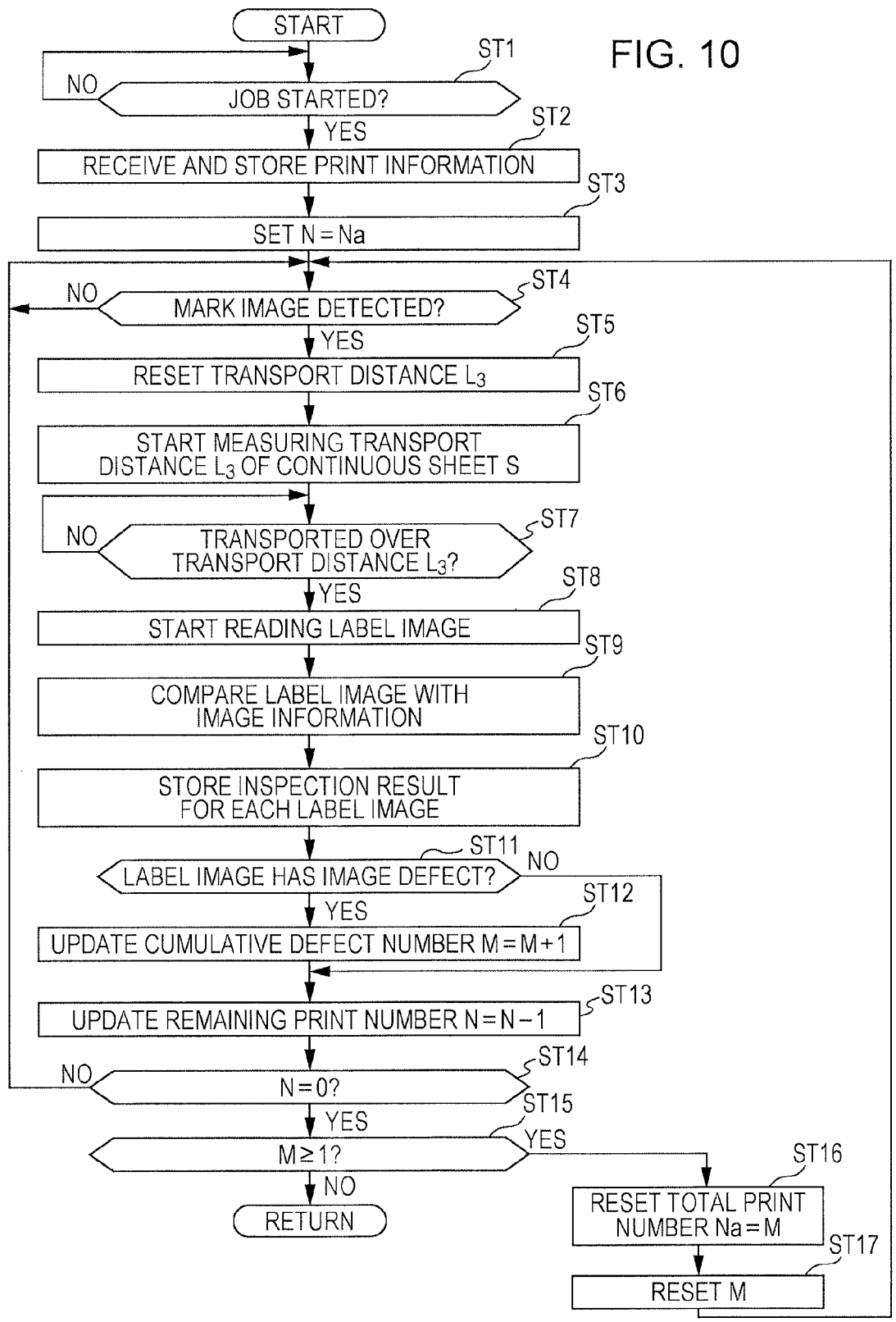
FIG. 10 is a flowchart representing the process of inspecting a read image according to the first exemplary embodiment.

FIG. 10 is a flowchart representing the process of inspecting a read image according to the first exemplary embodiment.

The process, including steps ST of the flowchart of FIG. 10, is performed in accordance with a program stored in the controller C of the image forming apparatus U. This process is performed simultaneously with other processes of the image forming apparatus U.

The process of the flowchart shown in FIG. 10 is started when the image forming apparatus U is switched on.

In step ST1 of FIG. 10, whether or not an image forming operation, which is so-called a job, has been started is determined. If yes (Y), the process proceeds to step ST2. If no (N), step ST1 is repeated.

In step ST2, print information is received and stored. Then, the process proceeds to step ST3.

In step ST3, the total print number Na is set to be the remaining print number N. Then, the process proceeds to step ST4.

In step ST4, whether or not the mark image Tnb has been read by the line camera 9 is determined. If yes (Y), the process proceeds to step ST5. If no (N), step ST4 is repeated.

In step ST5, the transport distance $L_3$ of the pasted body 34 is initialized, or, in other words, reset. Then, the process proceeds to step ST6.

In step ST6, measurement of the transport distance $L_3$ of the pasted body 34 is started. Then, the process proceeds to step ST7.

In step ST7, whether or not the pasted body 34 has been transported over the transport distance $L_3$ is determined. If yes (Y), the process proceeds to step ST8. If no (N), step ST7 is repeated.

In step ST8, the label image Tna is started to be read by using the line camera 9. Then, the process proceeds to step ST9.

In step ST9, image information for the label image Tna is compared with the read image. Then, the process proceeds to step ST10.

In step ST10, the result of the inspection for each label image Tna is stored. Then, the process proceeds to step ST11.

In step ST11, whether or not the read label image Tna has an image defect is determined. If yes (Y), the process proceeds to step ST12. If no (N), the process proceeds to step ST13.

In step ST12, the cumulative image defect number M is incremented by 1. That is, M=M+1. Then, the process proceeds to step ST13.

In step ST13, the remaining print number N is decremented by 1. That is, N=N−1. Then, the process proceeds to step ST14.

In step ST14, whether or not the remaining print number N is 0 is determined. If yes (Y), the process proceeds to step ST15. If no (N), the process returns to step ST4.

In step ST15, whether or not the cumulative image defect number M is 1 or larger is determined. If yes (Y), the process proceeds to step ST16. If no (N), the process returns to step ST1.

In step ST16, the remaining print number N is set to be M. That is, N=M. Then, the process proceeds to step ST17.

In step ST17, the cumulative image defect number M is reset. Then, the process returns to step ST4.

Description of Process Controlling Rotation of Transport Unit

Figure 11:
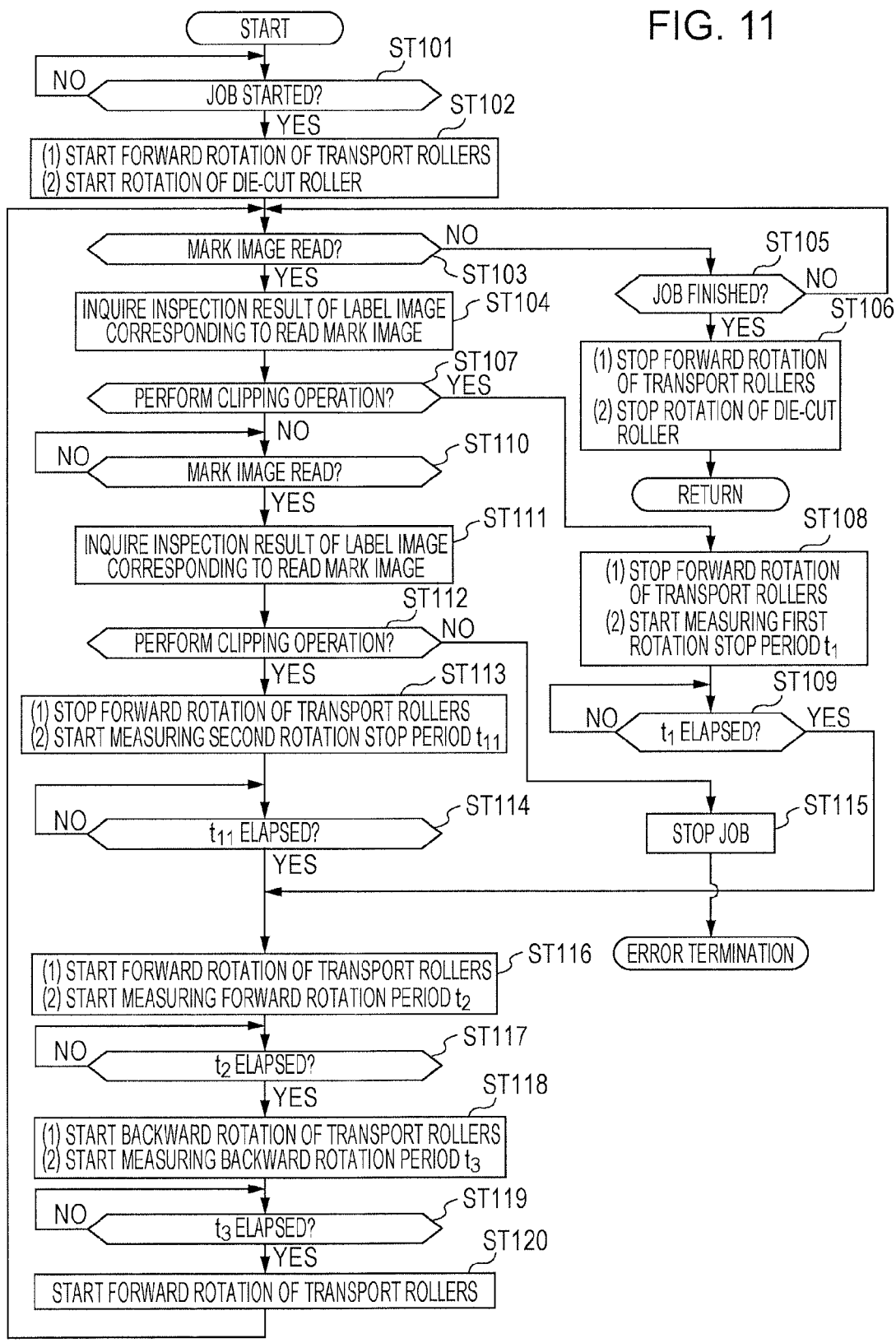
FIG. 11 is a flowchart representing the process of controlling rotation of the transport unit according to the first exemplary embodiment.

FIG. 11 is a flowchart representing the process of controlling rotation of a transport unit according to the first exemplary embodiment.

The process, including steps ST of the flowchart of FIG. 11, is performed in accordance with a program stored in the controller C of the image forming apparatus U. This process is performed simultaneously with other processes of the image forming apparatus U.

The process of the flowchart shown in FIG. 11 is started when the image forming apparatus U is switched on.

In step ST101 of FIG. 11, whether or not an image forming operation, which is a so-called job, has been started is determined. If yes (Y), the process proceeds to step ST102. If no (N), step ST101 is repeated.

In step ST102, the following operations (1) and (2) are performed, and the process proceeds to step ST103.

(1) Forward rotation of each of the transport rollers 41 and 58 is started.

(2) Rotation of the die-cut roller 52 is started.

In step ST103, whether or not the mark image Tnb has been read is determined. If yes (Y), the process proceeds to step ST104. If no (N), the process proceeds to step ST105.

In step ST104, inquiry to a label image Tna corresponding to the read mark image Tnb is performed. Then, the process proceeds to step ST107.

In step ST105, whether or not to finish the job is determined. If yes (Y), the process proceeds to step ST106. If no (N), the process returns to step ST103.

In step ST106, the following operations (1) and (2) are performed, and the process returns to step ST101.
(1) Forward rotation of each of the transport rollers 41 and 58 is stopped.
(2) Rotation of the die-cut roller 52 is stopped.

In step ST107, whether or not to perform a clipping operation is determined. If yes (Y), the process proceeds to step ST108. If no (N), the process proceeds to step ST110.

In step ST108, the following operations (1) and (2) are performed, and the process proceeds to step ST109.
(1) Forward rotation of each of the transport rollers 41 and 58 is stopped.
(2) Measurement of the first stop period $t_1$ is started.

In step ST109, whether or not the first stop period $t_1$ has elapsed is determined. If yes (Y), the process proceeds to step ST116. If no (N), step ST109 is repeated.

In step ST110, whether or not the mark image Tnb has been read by the mark sensor 43 is determined. If yes (Y), the process proceeds to step ST111. If no (N), step ST110 is repeated.

In step ST111, inquiry to a label image Tna corresponding to the read mark image Tnb is performed. Then, the process proceeds to step ST112.

In step ST112, whether or not to perform a clipping operation is determined. If yes (Y), the process proceeds to step ST113. If no (N), the process proceeds to step ST115.

In step ST113, the following operations (1) and (2) are performed, and the process proceeds to step ST114.
(1) Forward rotation of each of the transport rollers 41 and 58 is stopped.
(2) Measurement of the second stop period $t_{11}$ is started.

In step ST114, whether or not the second stop period $t_{11}$ has elapsed is determined. If yes (Y), the process proceeds to step ST116. If no (N), step ST114 is repeated.

In step ST115, the job is finished. Then, the process terminates with an error.

In step ST116, the following operations (1) and (2) are performed, and the process proceeds to step ST117.
(1) Forward rotation of each of the transport rollers 41 and 58 is started.
(2) Measurement of the forward rotation period $t_2$ is started.

In step ST117, whether or not the forward rotation period $t_2$ has elapsed is determined. If yes (Y), the process proceeds to step ST118. If no (N), step ST117 is repeated.

In step ST118, the following operations (1) and (2) are performed, and the process proceeds to step ST119.
(1) Backward rotation of each of the transport rollers 41 and 58 is started.
(2) Measurement of the backward rotation period $t_3$ is started.

In step ST119, whether or not the backward rotation period $t_3$ has elapsed is determined. If yes (Y), the process proceeds to step ST120. If no (N), step ST119 is repeated.

In step ST120, forward rotation of each of the transport rollers 41 and 58 is started. Then, the process returns to step ST103.

Operations of Pasting Unit and Postprocessing Unit

In the image forming apparatus U according to the first exemplary embodiment, which has the structure described above, the continuous sheet S, on which the printer unit U1 has recorded the toner image Tn, is transported to the pasting device U2. In the pasting device U2 according to the first exemplary embodiment, when the continuous sheet S passes through the reading position P1, the mark image Tnb and the label image Tna are successively read by the line camera 9. The read label image Tna is compared with the original image information, and whether or not the image has an image defect is determined. That is, the presence/absence of an image defect in the formed label image Tna is determined.

Next, the transported continuous sheet S and the protection film 17 are nipped between the pasting rollers 31, and the pasted body 34 is formed. Accordingly, in the pasted body 34 according to the first exemplary embodiment, the surface of the continuous sheet S, which is an example of an image surface of a medium, is covered by the protection film 17, and the toner image Tn recorded on the continuous sheet S is protected. The formed pasted body 34 is transported to the label forming device U3.

In the label forming device U3 according to the first exemplary embodiment, the transported mark image Tnb is read by the mark sensor 43. The presence/absence of an image defect in a label image Tna corresponding to the read mark image Tnb is inquired. If the label image Tna does not have an image defect, it is determined that a clipping operation is to be performed, and, if the label image Tna has an image defect, it is determined that a clipping operation is not to be performed. If it is determined that a clipping operation is to be performed, the transport rollers 41 and 58 are rotated in the forward direction and in the backward direction, and the front end of the label image Tna is aligned with the stand-by position P3. The pasted body 34 is transported in synchronism with movement of the blade 53 of the die-cut roller 52, and the blade 53 forms a cut along the inner edge Tna1 of the label image Tna.

If it is determined that a clipping operation is not to be performed, the transport rollers 41 and 58 continue to rotate in the forward direction, and the defective label image Tna' passes through the clipping region E1 before the blade 53 reaches the stand-by position P3. Thus, the blade 53 does not form a cut in the defective label image Tna'.

When the pasted body 34, which has passed through the cutting region E1, passes through the split roller 66, the scrap member 34b is peeled off the release sheet 4. At this time, the label member 34a, which is clipped along the inner edge Tna1, remains attached to the release sheet 4, and the label member 34a is separated from the scrap member 34b.

The defective label image Tna' is not clipped and is separated from the release sheet 4 together with the scrap member 34b. The second winding roller 67 winds the label member 34a that does not have an image defect together with the release sheet 4, and the first winding roller 72 winds the defective label image Tna' together with the scrap member 34b. Thus, with the label forming device U3 according to the first exemplary embodiment, the release sheet 4 wound by the second winding roller 67 does not include the defective toner image Tna'. Thus, it is possible to remove a defective product having an image defect.

With a structure described in Japanese Unexamined Patent Application Publication No. 8-2787 (paragraphs "0028" and "0032", and FIGS. 1, 3, and 6), an image formed on a label substrate (12) is clipped without determining the presence/absence of an image defect.

With a structure described in Japanese Unexamined Patent Application Publication No. 2003-279312 (paragraphs "0018" to "0021", "0034", and "0034" to "0049"; and FIGS. 1 to 6), a CCD sensor (14) is disposed downstream of a clipping unit (36) in the direction in which a continuous seal (21) is transported. The CCD sensor (14) reads an image of a label (211a) clipped by the clipping unit (36), and displacement of clipping is detected on the basis of the read image of the label (211a) and image data. Thus, with the structure for detecting displacement of clipping described in Japanese Unexamined Patent Application Publication No. 2003-279312, it is necessary that the CCD sensor (14) be disposed downstream of a position at which an image of the label (211a) is clipped. If the CCD sensor (14) is disposed upstream of the position, it is not possible to detect displacement of clipping.

Accordingly, with the structure described in Japanese Unexamined Patent Application Publication No. 8-2787, the presence/absence of an image defect is not determined at all. With the structure described in Japanese Unexamined Patent Application Publication No. 2003-279312, it is not possible to dispose the CCD sensor (14) at a position upstream of a position at which an image formed on the continuous sheet is clipped. Thus, with the structures described in Japanese Unexamined Patent Application Publication Nos. 8-2787 and 2003-279312, an image formed on the continuous sheet is clipped regardless of the presence/absence of an image defect. Thus, when the scrap member is removed from the release sheet, label members that have image defects and label members that do not have image defects coexist. Thus, with the structures described in Japanese Unexamined Patent Application Publication Nos. 8-2787 and 2003-279312, when shipping non-defective label members that do not have image defects, it is necessary to selectively remove defective label members from a wound label member, which requires man-hours.

In contrast, with the structure of the first exemplary embodiment, the line camera 9 is disposed between the printer unit U1 and the rotary die-cutter 51. Thus, it is possible to determine the presence/absence of an image defect in the label image Tna before the label image Tna is clipped by the rotary die-cutter 51. Moreover, with the structure of the first exemplary embodiment, the defective label image Tna' is not clipped and wound together with the scrap member 34b. Accordingly, it is possible to avoid coexistence of the label image Tna and the defective label image Tna'. Thus, as compared with the structure with which the presence/absence of an image defect is not determined before clipping the label image Tna, with the structure of the first exemplary embodiment, it is not necessary to perform an operation of selectively removing defective label images, and therefore it is possible to save man-hours for such an operation.

With a structure described in Japanese Unexamined Patent Application Publication No. 2014-191707 (paragraphs "0023", "0025" to "0032", "0057" to "0062", and "0065" to "0080"; and FIGS. 9 to 16), a continuous rolled sheet (S) is inspected by an inspection unit (20), and a defective image portion is not clipped by a laser cutter (33).

However, when the rolled sheet (S) is irradiated with a laser beam emitted from the laser cutter (33) described in Japanese Unexamined Patent Application Publication No. 2014-191707, heat is generated at an edge of a seal member (6). The heated seal member (6) may become degraded, discolored, or deformed.

In particular, with a structure in which the protection film 17 is stacked on the label sheet 7, as in the pasted body 34 according to the first exemplary embodiment, curl may occur if the thermal expansion coefficients of the protection film and the label sheet differ from each other.

In order to separate a substrate (3) and an adhesive layer (4) from each other without cutting a backing sheet (5) of the rolled sheet (S), it is necessary to precisely control the intensity and the focal position of a laser beam. If the rolled sheet (S) flutters in the thickness direction, defective clipping, such as penetration of the backing sheet (5) and failure in clipping the substrate (3) and the adhesive layer (4), is likely to occur.

In contrast, with the structure of the first exemplary embodiment, when performing a clipping operation, the label member 34a is not clipped by a laser beam but is clipped by the blade 53 of the rotary die-cutter 51 as the die-cut roller 52 rotates. Thus, as compared with the structure with which a label (6) is clipped by a laser beam, with the structure of the first exemplary embodiment, when performing a clipping operation, it is possible to reduce the amount of heat generated at the edge of the label member 34a and to reduce deformation or curl of even the pasted body 34.

With the structure of the first exemplary embodiment, when performing a clipping operation, the blade 53 forms a cut in a state in which the pasted body 34 is nipped between the die-cut roller 52 and the anvil roller 54. Accordingly, with the structure of the first exemplary embodiment, a cut is formed in a state in which the pasted body 34 is not likely to be displaced in the thickness direction.

Thus, with the rotary die-cutter 51 according to the first exemplary embodiment, without the need of precisely controlling the intensity and the focal position of the laser beam, it is possible to clip the protection film 17, the adhesive 16, the label sheet 7, and the adhesive 6 without fail, and it is possible to suppress clipping of the release sheet 4.

Accordingly, as compared with the structure with which the label (6) is clipped by using a laser beam, with the structure of the first exemplary embodiment, it is not necessary to provide a process or a circuit for precisely controlling the intensity and the focal position of a laser beam, and therefore the cost of the apparatus is reduced.

With the structure of the first exemplary embodiment, clipping is performed by continuously rotating the blade 53 of the die-cut roller 52 and adjusting the position by moving the pasted body 34 forward and backward.

Here, let it be assumed that clipping is performed by continuously transporting the pasted body 34 at a predetermined transport speed and adjusting the position by controlling the rotation of the die-cut roller 52. With this structure, the pasted body 34 is continuously transported downstream during a period from the time at which the blade 53 clips a label image to the time at which the blade 53 clips the next label image. Thus, it is necessary to set the distance between adjacent label images to be larger than the circumference of the die-cut roller 52.

In contrast, with the structure of the first exemplary embodiment, when clipping is performed, the position is adjusted by moving the pasted body 34 backward and forward or stopping the pasted body 34. Thus, it is possible to make the distance over which the pasted body 34 is transported downstream during a period from the time at which the blade 53 clips a label image Tna to the time at which the blade 53 reaches the stand-by position P3 again be shorter than that of a case where the position is adjusted by controlling the rotation of the die-cut roller 52. Thus, it is possible to reduce the distance between adjacent label images Tna. Accordingly, it is possible to reduce the width of a space between the label images Tna, in which no image is formed, and unnecessary consumption of the continuous sheet S and the protection film 17 is reduced.

With the structure of the first exemplary embodiment, when the remaining print number N reaches the predetermined total print number Na, the cumulative image defect number M is added as the remaining print number N. In other words, the number of prints is automatically increased by the number of image defects and printing is performed. Accordingly, as compared with a structure with which the cumulative image defect number M is not added as the remaining print number N, with the structure of the first exemplary embodiment, it is not necessary to subsequently and additionally perform printing a number of times equal to the image defect number M. Thus, even a defect is generated in the label image Tna, it is possible to produce a predetermined number Na of non-defective label members 34a.

With the structure of the first exemplary embodiment, if two defective label image Tna' are successively arranged, the job terminates with an error. If two defective label images Tna' are successively arranged, malfunctioning of the printer unit U1, which forms a label image Tna, may have occurred. If the job were continued in a state in which the printer unit U1 is malfunctioning, defective label images Tna' would be successively formed on the sheet S. In contrast, with the structure of the first exemplary embodiment, if two defective label image Tna' are successively arranged, the job is finished, and continuous formation of defective label images Tna' on the continuous sheet S is reduced. Thus, as compared with the case where the job is not terminated with an error, with the structure of the first exemplary embodiment, unnecessary consumption of the continuous sheet S, toner transferred to the continuous sheet S, and the protection film 17 is reduced.

Second Exemplary Embodiment

Next, a second exemplary embodiment of the present invention will be described. In the description of the second exemplary embodiment, elements corresponding to those of the first exemplary embodiment will be denoted by the same numerals and detail descriptions of such elements will be omitted.

The second exemplary embodiment is different from the first exemplary embodiment in the following respects but is the same as the first exemplary embodiment in the other respects.

Description of Pasting device according to Second Exemplary Embodiment

Figure 12:
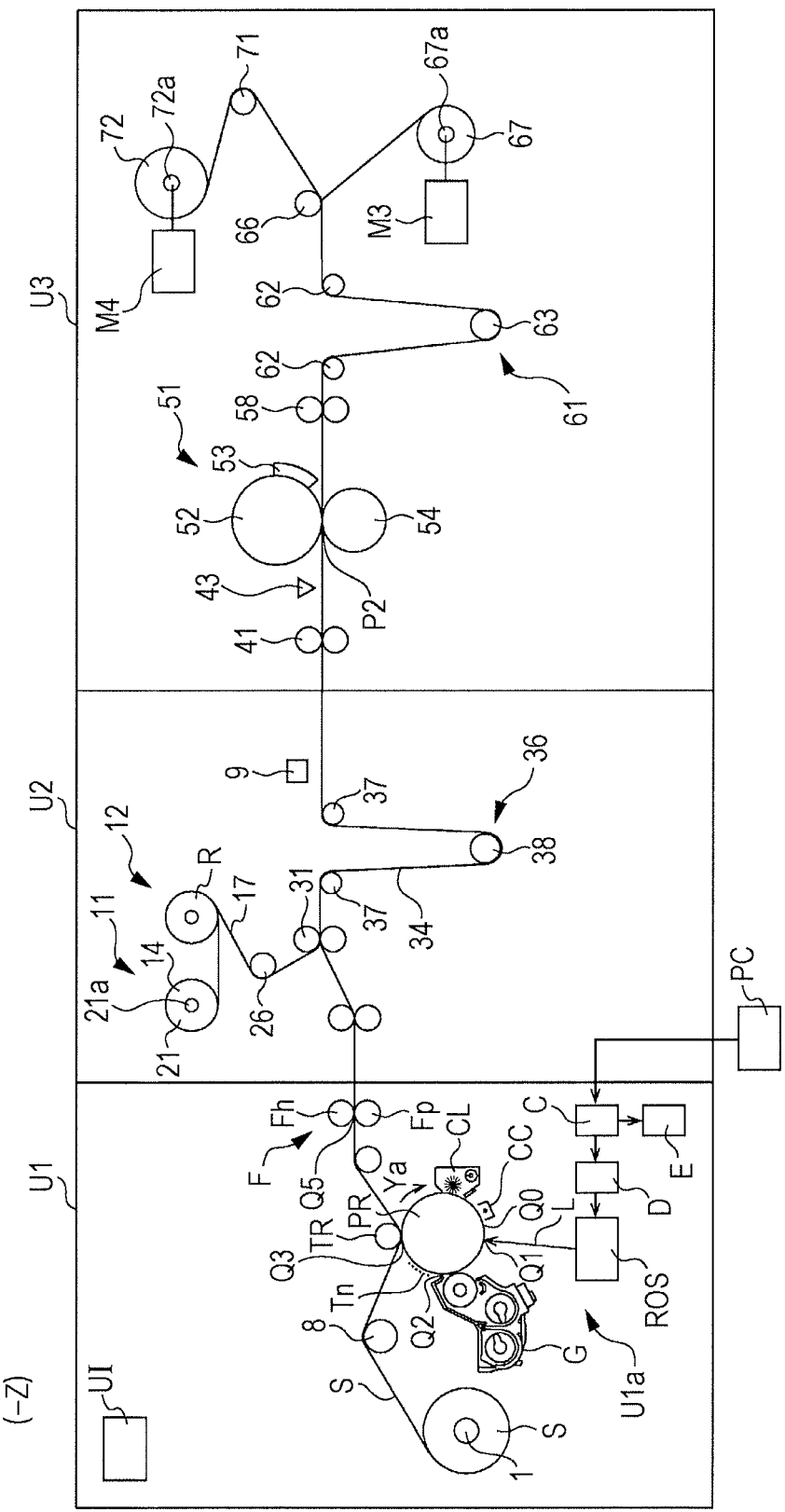
FIG. 12 illustrates the entirety of an image forming apparatus according to a second exemplary embodiment, corresponding to FIG. 1 of the first exemplary embodiment.

FIG. 12 illustrates the entirety of an image forming apparatus according to the second exemplary embodiment, corresponding to FIG. 1 of the first exemplary embodiment.

In the first exemplary embodiment, the line camera 9 is disposed at a position downstream of the printer unit U1 and upstream of the pasting rollers 31 in the direction in which the medium is transported. Instead, as illustrated in FIG. 12, in the image forming apparatus U according to the second exemplary embodiment, the line camera 9 is disposed at a position downstream of the pasting rollers 31 and upstream of the rotary die-cutter 51.

Operations of Pasting Unit and Postprocessing Unit

Figure 13A:
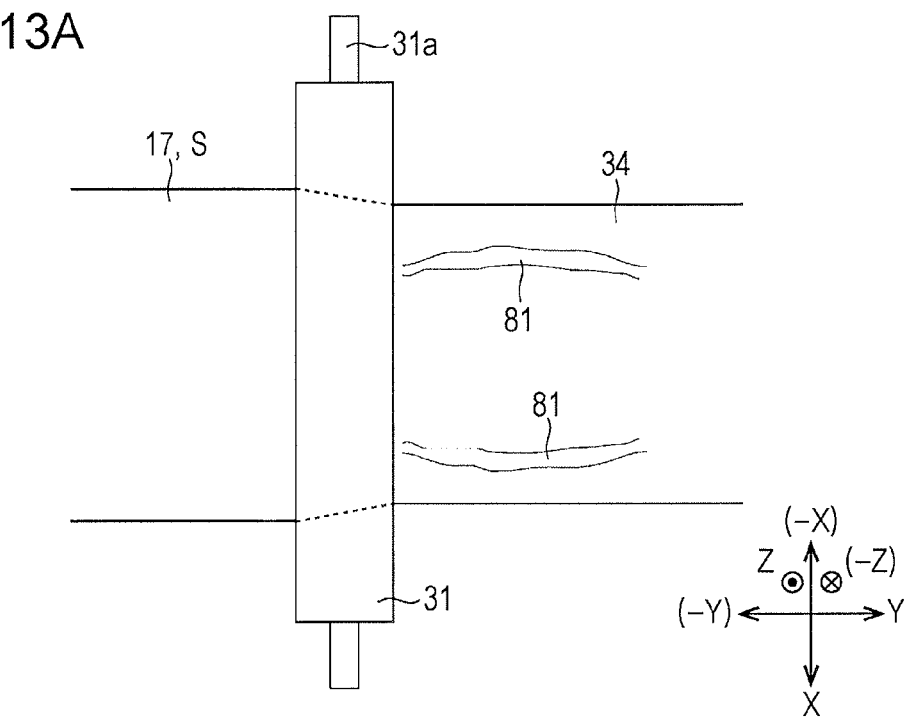
FIGS. 13A and 13B illustrate the assumed principle on which a crease is generated in a second front sheet in a pasting unit according to the second exemplary embodiment, FIG. 13A illustrating a part of the pasting unit seen from above, and FIG. 13B illustrating the pressure distribution in the pasting unit.
Figure 13B:
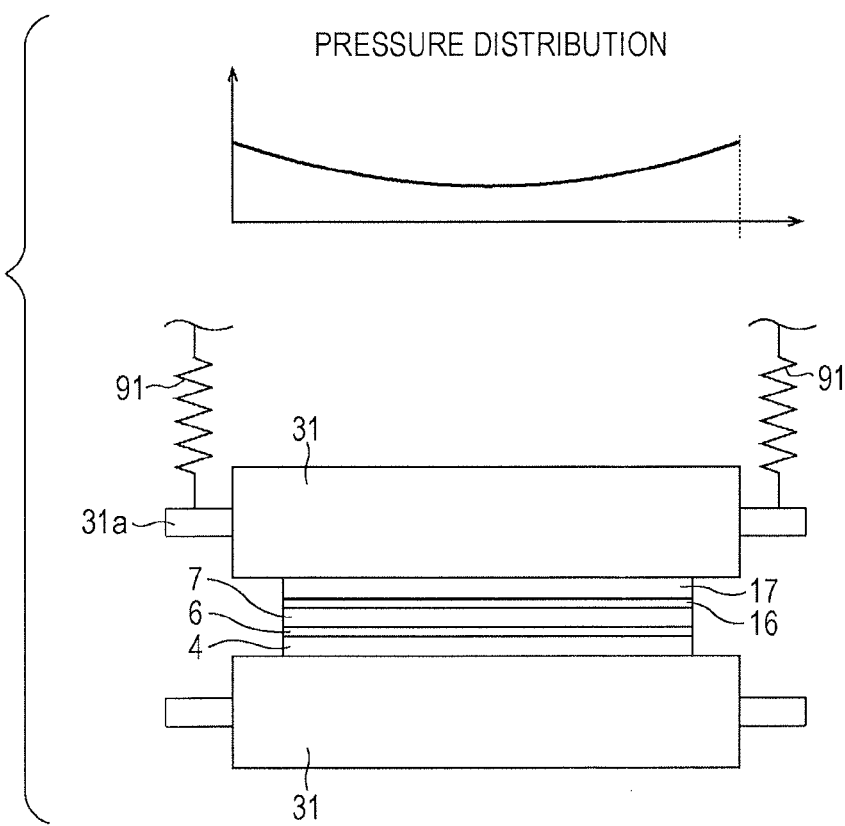

FIGS. 13A and 13B illustrate creases generated in a second front sheet in a pasting unit according to the second exemplary embodiment, FIG. 13A illustrating a part of the pasting unit seen from above, and FIG. 13B illustrating the pressure distribution in the pasting unit.

The image forming apparatus U according to the second exemplary embodiment, which has the structure described above, forms the pasted body 34 by nipping the continuous sheet S and the protection film 17 between the pasting rollers 31. In this case, it might happen that creases 81 are generated in the protection film 17 that has passed through the pasting rollers 31.

Referring to FIG. 13B, both end portions of the pasting roller 31 on the upper side are pressed against the pasting roller 31 on the lower side by springs 91. At this time, when pressed against the pasting roller 31 on the lower side, the pasting roller 31 on the lower side also become elastically deformed and receives a reactional force. Thus, when the pasting rollers 31 are in contact with each other, middle portions of the pasting rollers 31 in the axial direction, where the springs are not disposed, become warped in such directions that the middle portions become separated from each other.

Thus, the distance from a rotation shaft 31a to the outer surface of each pasting roller 31 at the middle portion becomes larger than that at both end portions of the pasting roller 31. Accordingly, a difference in the peripheral speed between both end portions and the middle portion arises, and the protection film 17 is transported at a lower speed at both end portions and at a higher speed at the middle portion. Thus, the creases 81 might be generated due to the difference in the speed between the middle portion and both end portions of the protection film 17. If the creases 81 were generated in the protection film 17, a defective label would be generated.

In contrast, with the structure of the second exemplary embodiment, the label images Tna are successively read by the line camera 9 during a period from the time at which the pasted body 34 passes through the pasting rollers 31 to the time at which the pasted body 34 is transported to the rotary die-cutter 51. Thus, with the structure of the second exemplary embodiment, it is possible to determine the presence/absence of an image defect or a pasting defect in each label image Tna after the protection film 17 has been pasted onto the label sheet 7. Accordingly, as compared with a structure that does not determine the presence/absence of a pasting defect, with the structure of the second exemplary embodiment, not only a label member having an image defect but also a label member having a pasting defect is automatically removed.

Modifications

Heretofore, exemplary embodiments of the present invention have been described in detail. However, the present invention is not limited to the exemplary embodiments and may be modified in various ways within the spirit and scope of the present invention described in the claims. Examples (H01) to (H014) of modifications of the present invention are as follows.

(H01) In the exemplary embodiments, the image forming apparatus U, which is an example of an image forming apparatus, is used as an example. However, this is not a limitation. The present invention may be applied to a printer, a fax, a multifunctional machine having the functions of a printer and a fax, and the like. The image forming apparatus U described above is a so-called monochrome image forming apparatus that prints only black K images. However, this is not a limitation. The present invention may be applied to a multicolor-development image forming apparatus that prints images of two or more colors. The present invention may be applied to not only a rotary-type image forming apparatus but also to a tandem-type image forming apparatus or the like. The present invention may be applied not only to an electrophotographic image forming apparatus but also to an image forming apparatus using any image forming method, such as an inkjet method, a thermal head method, a lithographic method, or the like.

(H02) In the exemplary embodiments, the image forming apparatus U forms a cut in the pasted body 34, in which the protection film 17 is pasted to the label sheet 7. However, this is not a limitation. For example, in a case of forming a label that does not have the film 17, it is not necessary to paste the protection film 17 to the label sheet 7.

(H03) In the exemplary embodiments, clipping is performed by continuously rotating the blade 53 of the die-cut roller 52 and adjusting the position by moving the pasted body 34 forward and backward. Alternatively, clipping may be performed by continuously transporting the pasted body 34 at a predetermined transport speed and adjusting the position by controlling the rotation of the die-cut roller 52.

(H04) In the exemplary embodiments, the buffer devices 36 and 61, which perform clipping by continuously transporting the pasted body 34 at a predetermined transport speed and adjusting the position by controlling the rotation of the die-cut roller 52, may be omitted.

(H05) In the exemplary embodiments, the protection film 17, which has a width corresponding to that of the continuous sheet S, is used as an example of a protection member and an example of a second front sheet. However, this is not a limitation. A film that has a width smaller than or equal to the width of the continuous sheet S and larger than or equal to the width of the label image Tna may be used.

(H06) In the exemplary embodiments, printing is performed by automatically adding the number of prints by a number equal to the number of the label images Tna having image defects. However, it is not necessary that the number of prints be automatically added.

(H07) In the exemplary embodiments, the job terminates with an error if the two defective label images Tna' are successively arranged. However, the job may continue even when two defective label images Tna' are successively arranged. This may be realized, for example, by stopping the rotation of the die-cut roller 52 and allowing two defective label images Tna' to pass through the die-cut roller 52.

(H08) In the exemplary embodiments, the mark image Tnb is formed at a position that is separated from a side end of the label image Tna by a distance $L_4$ outward in the width direction of the medium. However, this is not a limitation. For example, the mark image Tnb may be formed at a position inward from the side end of the label image Tna in the width direction of the medium.

(H09) In the exemplary embodiments, specific values used as examples may be appropriately changed according to the design, the specifications, and the like.

(H010) In the exemplary embodiments, the label member 34a is clipped by cutting the pasted body 34, in which the protection films 17 are stacked on the label sheet 7, by using the blade 53 of the rotary die-cutter 51, which is an example of a cutting unit. However, this is not a limitation. The label member 34a may be clipped by using a laser beam emitted from a laser cutter.

(H011) In the exemplary embodiments, when the blade 53 forms a cut in the pasted body 34 as the die-cut roller 52 rotates, the blade 53 forms a cut that does not penetrate the release sheet 4, and then the label member 34a, which is attached to the release sheet 4, is removed from the scrap member 34b. However, this is not a limitation. For example, when a blade forms a cut in the pasted body 34, the blade may penetrate the release sheet 4, clip the label member 34a together with the release sheet 4, and separate the label member 34a from the pasted body 34.

(H012) In the exemplary embodiments, the image forming apparatus U forms a cut in the pasted body 34 on which the toner image In has been formed by the printer unit U1, which is an example of an image forming unit. For example, instead of the image forming apparatus U, a cut forming apparatus, which does not include the visible image forming device UIa, may form a cut in a pasted body on which a toner image is not formed. Note that, with the structure of a label forming apparatus, it is possible to automatically remove a label member having a pasting defect by determining the presence/absence of a pasting defect after the protection film 17 has been pasted onto the label sheet 7.

(H013) In the exemplary embodiments, the pasted body 34, in which the label sheet 7 to which the protection film 17 is pasted to the surface thereof and the release sheet 4 are pasted to each other using the adhesive 6, is used as an example of a pasted body. However, this is not a limitation. For example, a medium that does not have the adhesive 6 and the release sheet 4 may be used, or a multilayer medium including inseparable layers may be used.

(H014) In the exemplary embodiments, the continuous pasted body 34 is used as an example. However, this is not a limitation. For example, the pasted body 34 may have a folding line or a groove that allows a user to tear the pasted body 34 with his/her hand. Such a folding line may be formed by forming a cut extending in the width direction of the pasted body 34 at a position upstream or downstream of the label image Tna on the pasted body 34. It is not necessary that the cut extend in the width direction of the medium. Perforated tear-off lines, which are linear cuts arranged with predetermined distances in the width direction of the medium, may be used.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:
1. An image forming apparatus comprising:
a transport unit that transports a continuous medium;
an image forming unit that forms an image on a surface of the medium;
a pasting unit that pastes a protection member to the surface of the medium on which the image has been formed;
an inspection unit disposed downstream of the image forming unit in a direction in which the medium is transported, the inspection unit inspecting whether the formed image is defective;
a cutting unit disposed downstream of the inspection unit in the direction in which the medium is transported, the cutting unit being capable of performing an operation of forming a cut in the protection member and the medium so as to surround the formed image; and a controller that controls the cutting unit so that the cutting unit does not perform the operation of forming a cut in the protection member and the medium if the image is defective, wherein the cutting unit includes a rotational body that rotates and a cutting member disposed on a part of an outer periphery of the rotational body, the cutting member periodically passing through a cutting position at which the cutting unit forms a cut so as to surround the image formed on the surface as the rotational body rotates, and wherein, if the image inspected by the inspection unit is not defective, the controller causes an image portion of the medium on which the image has been formed to be transported to the cutting position at the same time as the cutting member moves to the cutting position, and, if the image inspected by the inspection unit is defective, the controller causes the medium to be transported so that the image portion passes through the cutting position before the cutting member moves to the cutting position.

2. The image forming apparatus according to claim 1, further comprising:

a counting unit that counts the number of defective images included in the inspected images; and an adding unit that causes the image forming apparatus to additionally form a number of images equal to the number of defective images counted by the counting unit.

3. The image forming apparatus according to claim 2, wherein the inspection unit is disposed downstream of the pasting unit and upstream of the cutting unit in the direction in which the medium is transported.

4. The image forming apparatus according to claim 1, wherein the inspection unit is disposed downstream of the pasting unit and upstream of the cutting unit in the direction in which the medium is transported.

5. A cut forming apparatus comprising:

a transport unit that transports a continuous medium;

a pasting unit that pastes a protection member to a surface of the medium;

an inspection unit that inspects whether an image formed on the medium is defective;

a cutting unit comprising a rotational body and a cutting member disposed on a portion of an outer periphery of the rotational body, the cutting unit disposed downstream of the inspection unit in a direction in which the medium is transported and being capable of performing an operation of forming a cut in the protection member and the medium so as to surround the formed image; and a controller that controls a rotational timing of rotating the rotational body to cut the protection member and the medium if the image is not defective and to pass the protection member and medium without cutting the protection member and the medium if the image is defective.

6. An image forming apparatus comprising:

an image reading member that reads an image formed on a continuous medium at a reading position;

a rotational body having a cutting member disposed on a portion thereof, the rotational body disposed downstream of the reading position in a transport direction of the continuous medium; and a controller that determines whether the image is defective based on the read image and controls a rotational timing of the rotational body to cut into the continuous medium around the formed image at a cutting position if the image is not defective and to pass the formed image through the cutting position without cutting if the image is defective.

7. The image forming apparatus according to claim 6, wherein the medium comprises a plurality of layers formed on a release sheet, and the controller controls the rotational timing to cut the plurality of layers without cutting the release sheet if the image is not defective.

8. The image forming apparatus according to claim 7, wherein the layers comprise a label sheet on which the image is formed, an adhesive adhering the label sheet to the release sheet, a protection film, and an adhesive adhering the protection film to the label sheet.

* * * * *